United States Patent [19]

Tasaka et al.

[11] Patent Number: 5,640,943
[45] Date of Patent: Jun. 24, 1997

[54] AIR FLOW RATE CONTROL APPARATUS FOR INTERNAL COMBUSTION ENGINE

[75] Inventors: Hitoshi Tasaka, Chiryu; Kazunari Shirai, Oobu; Yoshimasa Nakaya, Nagoya, all of Japan

[73] Assignee: Nippondenso Co., Ltd., Kariya, Japan

[21] Appl. No.: 437,892

[22] Filed: May 10, 1995

[30] Foreign Application Priority Data

May 10, 1994 [JP] Japan .................................. 6-096420
May 10, 1994 [JP] Japan .................................. 6-096421

[51] Int. Cl.$^6$ .............................. F02D 41/20; H02P 8/22
[52] U.S. Cl. .......................... 123/399; 318/685; 318/696
[58] Field of Search .............................. 123/339.26, 361, 123/399; 318/685, 696

[56] References Cited

U.S. PATENT DOCUMENTS

| | | | |
|---|---|---|---|
| 4,490,664 | 12/1984 | Moriguchi | 318/696 |
| 4,710,691 | 12/1987 | Bergstrom et al. | 318/696 |
| 4,823,749 | 4/1989 | Eisenmann et al. | 123/339.26 |
| 4,854,283 | 8/1989 | Kiyono et al. | 123/361 |
| 4,929,879 | 5/1990 | Wright et al. | 318/685 |
| 5,433,283 | 7/1995 | Shultz et al. | 123/361 |

FOREIGN PATENT DOCUMENTS

| | | |
|---|---|---|
| 56-14834 | 2/1981 | Japan . |
| 59-204497 | 11/1984 | Japan . |
| 61-53437 | 3/1986 | Japan . |
| 63-147948 | 6/1988 | Japan . |
| 4-116240 | 4/1992 | Japan . |
| 5-79281 | 3/1993 | Japan . |
| 6-42390 | 2/1994 | Japan . |

OTHER PUBLICATIONS

Derwent Abstract WPI Accession No. 95–030856/05 and DE 4319715; Dec. 1994.
Derwent Abstract WPI Accession No. 94–127220/16 and DE 4233881; Apr. 1994.
Patent Abstracts of Japan; "Driving Method for Stepping Motor"; Appln. No. 1–194897; Aug. 1989.

*Primary Examiner*—Andrew M. Dolinar
*Attorney, Agent, or Firm*—Cushman Darby & Cushman IP Group of Pillsbury Madison & Sutro, LLP

[57] ABSTRACT

An air flow rate control apparatus for an internal combustion engine includes a stepping motor. The stepping motor has a plurality of coils and a rotor which is rotated by energizing the coils. A throttle valve connected to the rotor moves together with the rotor, and controls a rate of air flow drawn into the internal combustion engine. A control device is operative for feeding command currents of first and second command current values to first and second coils among the plurality of the coils respectively, and for controlling a degree of opening of the throttle valve. The first and second command current values correspond to a command degree of opening of the throttle valve at which the control device is intended to control the throttle valve. A direction of a resultant of vector forces generated by the first and second command currents simultaneously fed to the first and second coils corresponds to a held position of the rotor. A magnitude of the resultant of the vector forces corresponds to a magnitude of a hold force of the rotor.

6 Claims, 22 Drawing Sheets

FIG. 9

| THROTTLE VALVE OPEN DEGREE | A PHASE | B PHASE |
|---|---|---|
| 0° | 3.47A | 0.00A |
| 0.1° | 3.47A | 0.34A |
| 0.2° | 3.43A | 0.68A |
| 0.3° | 3.35A | 1.01A |
| 0.4° | 3.24A | 1.34A |
| ⋮ | ⋮ | ⋮ |

FIG. 12

| THROTTLE VALVE OPEN DEGREE | A PHASE | | B PHASE | |
|---|---|---|---|---|
| | COMMAND VALUE | (TARGET VALUE) | COMMAND VALUE | (TARGET VALUE) |
| 0° | 3.47A | (3.47A) | 0.00A | (0.00A) |
| 0.1° | 3.47A | (3.47A) | 0.34A | (0.34A) |
| 0.2° | 3.43A | (3.43A) | 0.68A | (0.68A) |
| 0.3° | 3.35A | (3.35A) | 1.01A | (1.01A) |
| 0.4° | 3.24A | (3.24A) | 1.34A | (1.34A) |
| ⋮ | ⋮ | ⋮ | ⋮ | ⋮ |

A-PHASE ENERGIZED BY 3.47A

A-PHASE AND B-PHASE ENERGIZED BY 3.47A AND 0.34A RESPECTIVELY

A-PHASE AND B-PHASE ENERGIZED BY 6.94A AND 0.68A RESPECTIVELY

A-PHASE AND B-PHASE ENERGIZED BY 6.94A AND 0.68A RESPECTIVELY

A-PHASE AND B-PHASE ENERGIZED BY 3.47A AND 0.34A RESPECTIVELY

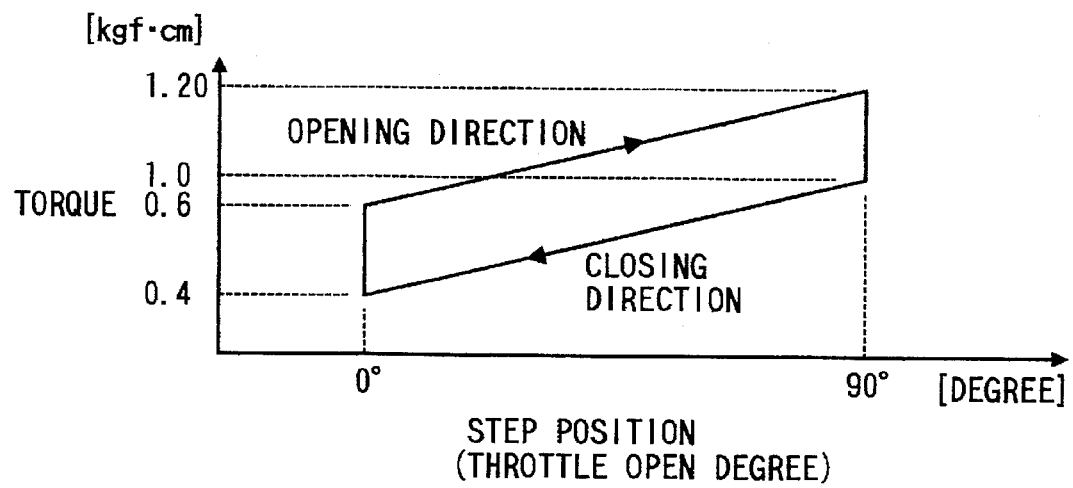

FIG. 30

| MOTOR STEP POSITION | A PHASE | B PHASE |
|---|---|---|
| 0 | 3.48A | 0.01A |
| 1 | 3.48A | 0.35A |
| 2 | 3.44A | 0.69A |
| 3 | 3.36A | 1.02A |
| 4 | 3.25A | 1.35A |
| ⋮ | ⋮ | ⋮ |

AIR FLOW RATE CONTROL APPARATUS FOR INTERNAL COMBUSTION ENGINE

BACKGROUND OF THE INVENTION

1. Field of the Invention

This invention relates to an air flow rate control apparatus for an internal combustion engine.

2. Description of the Prior Art

Most of internal combustion engines have a movable throttle valve for controlling the rate of air flow into engine combustion chambers. In some automotive vehicles powered by internal combustion engines, an engine throttle valve is driven by an electric motor in response to vehicle driver's requirement. In such cases, it is desirable that the engine throttle valve can quickly respond to the vehicle driver's requirement.

SUMMARY OF THE INVENTION

It is an object of this invention to provide an improved air flow rate control apparatus for an internal combustion engine.

A first aspect of this invention provides an air flow rate control apparatus for an internal combustion engine which comprises a stepping motor including a plurality of coils and a rotor which is rotated by energizing the coils; a throttle valve connected to the rotor for motion together with the rotor and controlling a rate of air flow drawn into the internal combustion engine; and control means for feeding command currents of first and second command current values to first and second coils among the plurality of the coils respectively, and for controlling a degree of opening of the throttle valve; wherein the first and second command current values correspond to a command degree of opening of the throttle valve at which the control means is intended to control the throttle valve; and wherein a direction of a resultant of vector forces generated by the first and second command currents simultaneously fed to the first and second coils corresponds to a held position of the rotor, and a magnitude of the resultant of the vector forces corresponds to a magnitude of a hold force of the rotor.

A second aspect of this invention is based on the first aspect thereof, and provides an air flow rate-control apparatus wherein the throttle valve performs at least one of air flow rate control related to engine idle speed control, air flow rate control related to vehicle traction control, air flow rate control related to vehicle cruise control, and air flow rate control in response to a degree of actuation of an accelerator.

A third aspect of this invention is based on the second aspect thereof, and provides an air flow rate control apparatus further comprising memory means for storing command drive amounts being amounts of drive of the throttle valve to be controlled by the control means, and for storing the command current values corresponding to the command drive amounts as stored current values; detecting means for detecting an actual drive amount by which the throttle valve is actually controlled when the command values are fed by the control means; and correcting means for correcting the stored current values in a direction of equalizing the actual drive amount and the command drive amount in cases where the command drive amount differs from the actual drive amount.

A fourth aspect of this invention is based on the third aspect thereof, and provides an air flow rate control apparatus wherein the detecting means detects an actual opening degree being an actual degree of opening of the throttle valve as the actual drive amount; the command drive amount is the command opening degree; the correcting means corrects the command current values to equalize the actual opening degree and the command opening degree in cases where the command opening degree and the actual opening degree are different from each other; and the correcting means corrects the stored current values so that the command current values fed by the control means are realized in cases where the command opening degree and the actual opening degree become equal to each other.

A fifth aspect of this invention is based on the fourth aspect thereof, and provides an air flow rate control apparatus wherein the correcting means corrects the stored current values at every given timing; corrected stored current values are determined for one given timing; and the determined current values correspond to a minimum value which can be controlled by the control means.

A sixth aspect of this invention is based on the fourth aspect thereof, and provides an air flow rate control apparatus wherein the correcting means corrects the stored current values at every given timing; corrected stored current values are determined for one given timing; and the determined current values are equal to current values corresponding to a difference between the command opening degree and the actual opening degree.

A seventh aspect of this Invention is based on the third aspect thereof, and provides an air flow rate control apparatus wherein the detecting means detects an actual current value being a current value actually flowing through the stepping motor as the actual drive amount; the command drive amount is a target current value being a current value which flows through the stepping motor to realize the command opening degree; the correcting means corrects the command current values to equalize the actual current value and the target current value in cases where the target current value and the actual current value are different from each other; and the correcting means corrects the stored current values so that the command current values fed by the control means are realized in cases where the target current value and the actual current value become equal to each other.

An eighth aspect of this invention is based on the seventh aspect thereof, and provides an air flow rate control apparatus wherein the correcting means corrects the stored current values at every given timing; corrected stored current values are determined for one given timing; and the determined current values correspond to a minimum value which can be controlled by the control means.

A ninth aspect of this invention is based on the seventh aspect thereof, and provides an air flow rate control apparatus wherein the correcting means corrects the stored current values at every given timing; corrected stored current values are determined for one given timing; and the determined current values are equal to current values corresponding to a difference between the target current value and the actual current value.

A tenth aspect of this invention is based on the third aspect thereof, and provides an air flow rate control apparatus wherein the detecting means detects an actual current value being a current value actually flowing through the stepping motor and an actual opening degree being an actual degree of opening of the throttle valve as the actual drive amount; the command drive amount is the command opening degree and a target current value being a current value which flows through the stepping motor to realize the command opening degree; the correcting means corrects the command current values to equalize the actual current value and the target current value in cases where the target current value and the actual current value are different from each other; the correcting means corrects the stored current values so that the command current values fed by the control means are realized in cases where the target current value and the actual current value become equal to each other; the correcting means corrects the command current values to equalize the actual opening degree and the command opening degree in cases where the command opening degree and the actual opening degree are different from each other; and the correcting means corrects the stored current values and the target current values so that the command current values fed by the control means are realized in cases where the command opening degree and the actual opening degree become equal to each other.

An eleventh aspect of this invention is based on the second aspect thereof, and provides an air flow rate control apparatus further comprising memory means for storing the command current values as stored current values; and wherein in cases where the rotor is driven from a stationary state to another held position, the control means feeds command currents of current values, which are equal to a given value of 1 or more times the stored current values corresponding to the held position.

A twelfth aspect of this invention is based on the second aspect thereof, and provides an air flow rate control apparatus further comprising a spring which urges the throttle valve in one direction of rotation of the throttle valve; and memory means for storing the command current values as stored current values; wherein the stored current values are of first and second types, and the stored current values of the first and second types are predetermined depending on an urging force exerted by the spring; and wherein the control means selects one of the stored current values of the first type and the stored current values of the second type in response to a direction of rotation of the throttle valve, and feeds command currents of the selected current values to the coils to control the degree of opening of the throttle valve.

A thirteenth aspect of this invention is based on the twelfth aspect thereof, and provides an air flow rate control apparatus wherein with regard to the stored current values of the first and second types: the stored current values selected during drive in a direction opposite the direction of the urging by the spring correspond to a force being greater than a resultant of a frictional force generated by rotation of the rotor and the urging force by the spring and being a drive force in a direction opposite the direction of the urging by the spring; and the stored current values selected during drive in a direction equal to the direction of the urging by the spring correspond to a force being smaller than the resultant of the frictional force generated by rotation of the rotor and the urging force by the spring and being a drive force in a direction opposite the direction of the urging by the spring.

A fourteenth aspect of this invention is based on the second aspect thereof, and provides an air flow rate control apparatus further comprising a spring which urges the throttle valve in one direction of rotation of the throttle valve; and memory means for storing the command current values as stored current values; wherein first and second coefficients are predetermined in correspondence with two directions of rotation of the throttle valve respectively, the first and second coefficients depend on an urging force exerted by the spring; and wherein the control means selects one of the first and second coefficients in response to a direction of rotation of the throttle valve, and calculates products of the selected coefficient and the stored current values and feeds command currents of the products to the coils to control the degree of opening of the throttle valve.

A fifteenth aspect of this invention is based on the fourteenth aspect thereof, and provides an air flow rate control apparatus wherein with regard to the first and second coefficients: the coefficient selected during drive in a direction opposite the direction of the urging by the spring corresponds to a force being greater than a resultant of a frictional force generated by rotation of the rotor and the urging force by the spring and being a drive force in a direction opposite the direction of the urging by the spring; and the coefficient selected during drive in a direction equal to the direction of the urging by the spring corresponds to a force being smaller than the resultant of the frictional force generated by rotation of the rotor and the urging force by the spring and being a drive force in a direction opposite the direction of the urging by the spring.

A sixteenth aspect of this invention provides a learning-based correction apparatus comprising a stepping motor including a plurality of coils and a rotor which is rotated by feeding currents to the coils, wherein currents of various magnitudes are simultaneously fed to two of the coils, and thereby the rotor is held at an arbitrary position depending current values thereof; memory means for storing current values of drive of the stepping motor on the basis of held positions of the rotor; control means for deciding current values based on a desired held position of the rotor from among the current values stored in the memory means, and for feeding currents of the decided current values to the stepping motor; drive amount detecting means for, in cases where the stepping motor is fed with the currents by the control means so that the stepping motor is driven, detecting an amount of drive of the stepping motor; and learning-based correcting means for correcting the current values stored in the memory means through a leaning process in response to the drive amount detected by the drive amount detecting means.

A seventeenth aspect of this invention is based on the sixteenth aspect thereof, and provides a learning-based correction apparatus further comprising a throttle valve driven by the stepping motor and controlling a rate of air flow into an internal combustion engine; and wherein the drive amount detecting means comprises a throttle sensor which detects a degree of opening of the throttle valve; and the learning-based correcting means comprises first throttle valve opening degree correcting means for correcting the current values stored in the memory means so that a degree of opening of the throttle valve which corresponds to the current values decided by the control means will be equal to the degree of opening of the throttle valve detected by the throttle sensor.

An eighteenth aspect of this invention is based on the seventeenth aspect thereof, and provides a learning-based correction apparatus wherein the first throttle valve opening degree correcting means comprises first throttle valve opening degree judgment means for judging whether or not the degree of opening of the throttle valve which corresponds to the current values decided by the control means is equal to the degree of opening of the throttle valve detected by the throttle sensor; and second throttle valve opening degree correcting means for, in cases where the degree of opening of the throttle valve which corresponds to the current values decided by the control means is found to be not equal to the degree of opening of the throttle valve detected by the throttle sensor by the first throttle valve opening degree judgment means, adding a given value to the current value related to one of the two coils and subtracting the given value from the current value related to the other of the two coils to correct the command values stored in the memory means.

A nineteenth aspect of this invention is based on the seventeenth aspect thereof, and provides a learning-based correction apparatus wherein the first throttle valve opening degree correcting means comprises first throttle valve opening degree judgment means for judging whether or not the degree of opening of the throttle valve which corresponds to the current values decided by the control means is equal to the degree of opening of the throttle valve detected by the throttle sensor; and third throttle valve opening degree correcting means for, in cases where the degree of opening of the throttle valve which corresponds to the current values decided by the control means is found to be not equal to the degree of opening of the throttle valve detected by the throttle sensor by the first throttle valve opening degree Judgment means, correcting the current values stored in the memory means in a direction of reducing a difference between the degree of opening of the throttle valve which corresponds to the current values decided by the control means and the degree of opening of the throttle valve detected by the throttle sensor by an mount corresponding to the difference between the degree of opening of the throttle valve which corresponds to the current values decided by the control means and the degree of opening of the throttle valve detected by the throttle sensor.

A twentieth aspect of this invention is based on the sixteenth aspect thereof, and provides a learning-based correction apparatus wherein the drive amount detecting means comprises current detecting means for detecting current values actually flowing through the stepping motor; the learning-based correcting means comprises target current value memory means for storing target values of currents flowing through the stepping motor in correspondence with the drive amount of the stepping motor; and the learning-based correcting means further comprises first current correcting means for correcting the current values stored in the memory means so that the target values stored in the target current value memory means will be equal to the current values detected by the current detecting means.

A twenty-first aspect of this invention is based on the twentieth aspect thereof, and provides a learning-based correction apparatus wherein the first current correcting means comprises current judgment means for judging whether the current values detected by the current detecting means are greater or smaller than the target values; and second current correcting means for correcting the current values stored in the memory means, for, in cases where the current values detected by the detecting means are found to be greater than the target values by the current judgment means, subtracting a given value from the current values decided by the control means, and for, in cases where the current values detected by the detecting means are found to be smaller than the target values by the current judgment means, adding the given value to the current values decided by the control means.

A twenty-second aspect of this invention is based on the twentieth aspect thereof, and provides a learning-based correction apparatus wherein the first current correcting means comprises current judgment means for judging whether the current values detected by the current detecting means are equal to the target values; calculation means for, in cases where the current values detected by the detecting means are found to be not equal to the target values by the current judgment means, calculating differences between the current values detected by the detecting means and the target values; and third current correcting means for correcting the current values stored in the memory means in a direction of reducing the differences between the current values detected by the detecting means and the target values by an amount corresponding to the differences between the current values detected by the detecting means and the target values which are calculated by the calculation means.

A twenty-third aspect of this invention is based on the sixteenth aspect thereof, and provides a learning-based correction apparatus wherein the drive amount detecting means comprises current detecting means for detecting current values actually flowing through the stepping motor and a throttle sensor for detecting a degree of opening of the throttle valve; the learning-based correcting means comprises target current value memory means for storing target values of currents flowing through the stepping motor in correspondence with the drive amount of the stepping motor; current judgment means for judging whether the current values detected by the current detecting means are equal to the target current values stored in the target current value memory means; fourth current correcting means for, in cases where the current values detected by the current detecting means are found to be not equal to the target current values stored in the target current value memory means by the current judgment means, correcting the current values stored in the memory means so that the current values detected by the current detecting means will be equal to the target current values stored in the target current value memory means; second throttle valve opening degree judgment means for judging whether or not the degree of opening of the throttle valve which corresponds to the current values decided by the control means is equal to the degree of opening of the throttle valve detected by the throttle sensor; and fifth current correcting means for, in cases where the degree of opening of the throttle valve which corresponds to the current values decided by the control means is found to be not equal to the degree of opening of the throttle valve detected by the throttle sensor by the second throttle valve opening degree judgment means, correcting the current values stored in the memory means so that the degree of opening of the throttle valve which corresponds to the current values decided by the control means will be equal to the degree of opening of the throttle valve detected by the throttle sensor.

A twenty-fourth aspect of this invention is based on the eighteenth aspect thereof, and provides a learning-based correction apparatus wherein the given value is equal to a minimum value which can be outputted by output means.

A twenty-fifth aspect of this invention is based on the sixteenth aspect thereof, and provides a learning-based correction apparatus wherein the learning-based correcting means comprises learning means for executing a learning process by correcting the current values stored in the memory means on the basis of the drive amount detected by the drive amount detecting means; and correcting means for correcting the current values decided by the control means which correspond to the drive amount detected by the drive amount detecting means.

A twenty-sixth aspect of this invention is based on the sixteenth aspect thereof, and provides a learning-based correction apparatus further comprising a throttle system having only one throttle valve driven by the stepping motor.

A twenty-seventh aspect of this invention provides a stepping motor control apparatus comprising a stepping motor including a plurality of coils and a rotor which is rotated by feeding currents to the coils, wherein currents of various magnitudes are simultaneously fed to two of the coils, and thereby the rotor is held at an arbitrary position between the two coils in accordance with current values thereof and output means for outputting currents to the two coils located at opposite sides of a desired held position of the rotor in response to the desired held position of the rotor to energize the two coils and to hold the rotor; the output means being operative for, in cases where a held position of the stepping motor is changed from a stationary state, outputting increased currents to the stepping motor to energize the two coils without changing a ratio between the currents.

A twenty-eighth aspect of this invention is based on the twenty-seventh aspect thereof, and provides a stepping motor control apparatus further comprising memory means for storing current values corresponding to desired held positions of the rotor and being outputted to the two coils located at opposite sides of the desired held position of the rotor; the output means being operative for, in cases where a held position of the stepping motor is changed from a stationary state, outputting currents to the two coils which are equal to a given value times the current values stored in the memory means.

A twenty-ninth aspect of this invention provides a stepping motor control apparatus comprising a stepping motor including a plurality of coils and a rotor which is rotated by feeding currents to the coils, wherein currents of various magnitudes are simultaneously fed to two of the coils, and thereby the rotor is held at an arbitrary position between the two coils in accordance with current values thereof; a return spring which executes an urging force in one direction of rotation of the rotor of the stepping motor; and output means for outputting currents to the two coils located at opposite sides of a desired held position of the rotor in response to the desired held position of the rotor to energize the two coils and to rotate the rotor; the output means being operative for, in cases where the rotor is rotated in a direction different from a direction of the urging force by the return spring, driving the rotor by a force greater than a resultant of the urging force by the return spring and a frictional force; the output means being operative for, in cases where the rotor is rotated in a direction equal to the direction of the urging force by the return spring, driving the rotor by a force smaller than the resultant of the urging force by the return spring and the frictional force; the output means being operative for varying magnitudes of the currents fed to the stepping motor in accordance with a direction of rotation of the rotor.

A thirtieth aspect of this invention is based on the twenty-ninth aspect thereof, and provides a stepping motor control apparatus further comprising memory means for storing current values corresponding to desired held positions of the rotor and being outputted to the two coils located at opposite sides of the desired held position of the rotor, wherein the stored current values depend on a direction of rotation of the rotor which occurs upon a change of the held position, and wherein the stored current values related to a direction different from a direction of the urging force by the return spring are greater than the stored current values related to a direction equal to the direction of the urging force by the return spring; the output means being operative for outputting currents of the current values stored in the memory means to the two coils in response to a direction of rotation of the rotor.

A thirty-first aspect of this invention is based on the twenty-ninth aspect thereof, and provides a stepping motor control apparatus further comprising memory means for storing current values corresponding to desired held positions of the rotor and being outputted to the two coils located at opposite sides of the desired held position of the rotor; the output means being operative for calculating products of given values depending on the direction of rotation of the rotor and the current values stored in the memory means, and outputting currents of the calculated products to the two coils.

A thirty-second aspect of this invention provides a stepping motor control apparatus comprising a stepping motor including a plurality of coils and a rotor which is rotated by feeding currents to the coils, wherein currents of various magnitudes are simultaneously fed to two of the coils, and thereby the rotor is held at an arbitrary position between the two coils in accordance with current values thereof; a return spring which executes an urging force in one direction of rotation of the rotor of the stepping motor; and output means for outputting currents to the two coils located at opposite sides of a desired held position of the rotor in response to the desired held position of the rotor to energize the two coils and to rotate the rotor; the output means being operative for, in cases where the rotor is rotated in a direction different from a direction of the urging force by the return spring, driving the rotor by a force greater than a resultant of the urging force by the return spring and a frictional force; the output means being operative for, in cases where the rotor is rotated in a direction equal to the direction of the urging force by the return spring, driving the rotor by a force smaller than the resultant of the urging force by the return spring and the frictional force; the output means being operative for varying magnitudes of the currents fed to the stepping motor in accordance with a direction of rotation of the rotor; the output means being operative for, in cases where a held position of the stepping motor is changed from a stationary state, outputting increased currents to the stepping motor to energize the two coils without changing a ratio between the currents.

A thirty-third aspect of this invention is based on the thirty-second aspect thereof, and provides a stepping motor control apparatus further comprising memory means for storing current values corresponding to desired held positions of the rotor and being outputted to the two coils located at opposite sides of the desired held position of the rotor; the output means being operative for calculating products of given values depending on the direction of rotation of the rotor and the current values stored in the memory means, and outputting currents of the calculated products to the two coils; the output means being operative for, in cases where a held position of the stepping motor is changed from a stationary state, outputting currents to the two coils which are equal to a given value times the current values fed to the two coils and depending on a drive direction.

A thirty-fourth aspect of this invention is based on the thirty-second aspect thereof, and provides a stepping motor control apparatus further comprising memory means for storing current values corresponding to desired held positions of the rotor and being outputted to the two coils located at opposite sides of the desired held position of the rotor, wherein the stored current values depend on a direction of rotation of the rotor which occurs upon a change of the held position, and wherein the stored current values related to a direction different from a direction of the urging force by the return spring are greater than the stored current values related to a direction equal to the direction of the urging force by the return spring; the output means being operative for, in cases where a held position of the stepping motor is changed from a stationary state, outputting currents to the two coils which are equal to a given value times the current values stored in the memory means.

A thirty-fifth aspect of this invention is based on the twenty-seventh aspect thereof, and provides a stepping motor control apparatus further comprising a throttle system having only one throttle valve driven by the stepping motor.

BRIEF DESCRIPTION OF THE DRAWINGS

FIG. 9 is a diagram of a portion of a command current value table in the system of FIG. 8.

FIG. 12 is a diagram of a portion of a command current value table in the system of FIG. 11.

FIG. 26 is a diagram of the relation between the angular position of the throttle valve and a load torque on the stepping motor in the system of FIG. 18.

FIG. 27 is a diagram of a portion of a first command current value table in a modified electronic throttle system for an internal combustion engine according to this invention.

FIG. 28 is a diagram of a portion of a second command current value table in the system related to FIG. 27.

FIG. 30 is a diagram of a portion of a command current value table in a modified electronic throttle system for an internal combustion engine according to this invention.

DESCRIPTION OF THE PREFERRED EMBODIMENT

Before a detailed description of this invention, a prior-art system will be described for a better understanding of this invention.

Prior Art

Figure 1:
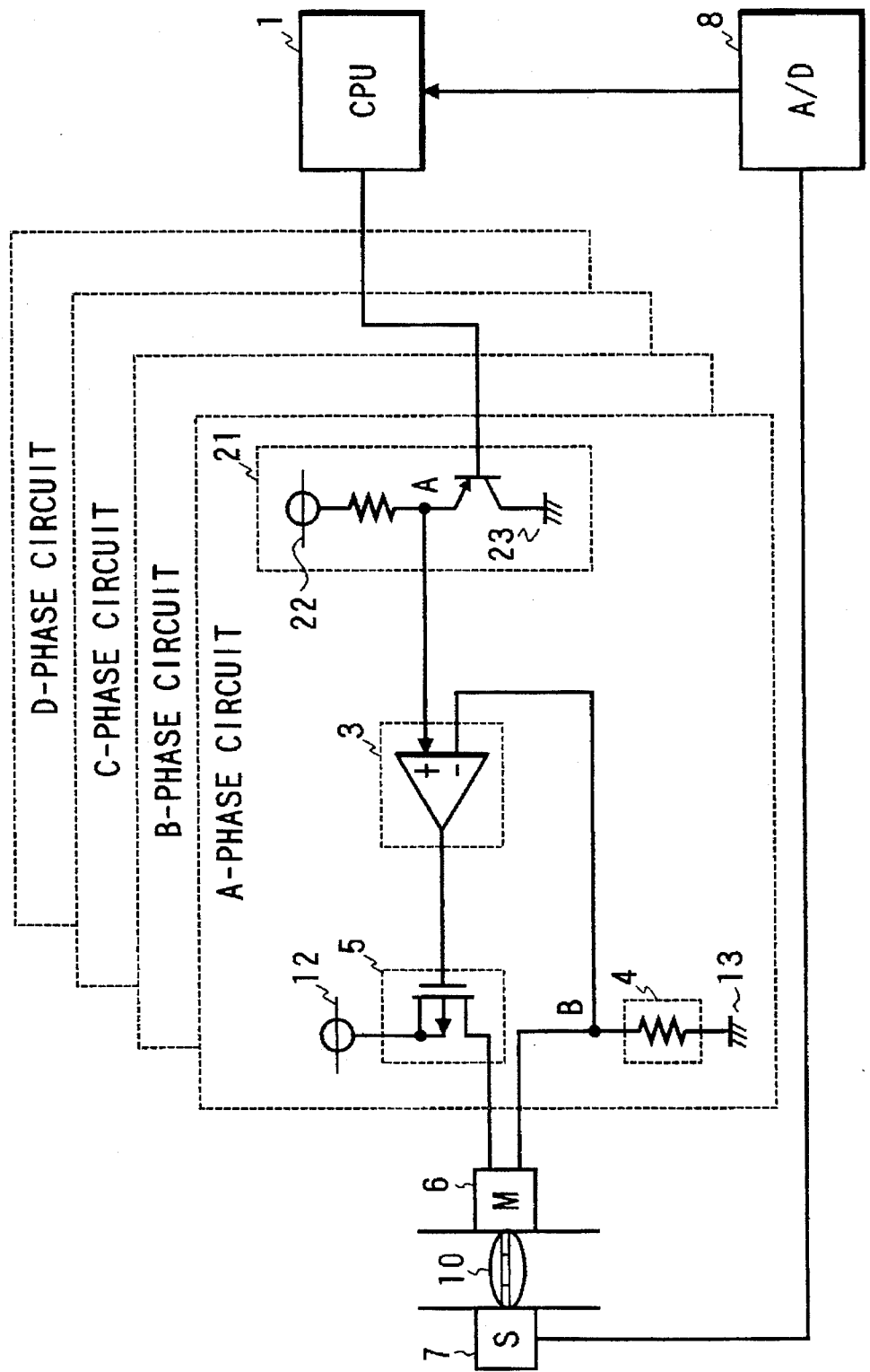
FIG. 1 is a diagram of a prior-art electronic throttle system for an internal combustion engine.

FIG. 1 shows a prior-art electronic throttle system for an internal combustion engine which powers a vehicle. With reference to FIG. 1, a throttle valve 10 is rotatably disposed in an air induction passage of the engine to adjustably determine the rate of air flow into combustion chambers of the engine. A stepping motor 6 serves to drive the throttle valve 10.

In the prior-art system of FIG. 1, an accelerator position sensor (not shown) associated with an accelerator pedal (not shown) outputs a signal representing the degree of depression of the accelerator pedal which is executed by a vehicle driver. An electronic control unit (ECU) including a CPU (central processing unit) 1 and a drive circuit for the stepping motor 6 is informed of the output signal of the accelerator position sensor which represents the degree of depression of the accelerator pedal.

The ECU calculates the desired amount of control of the throttle valve 10 or the desired position of the throttle valve 10 in response to the degree of depression of the accelerator pedal. The ECU generates a drive signal in response to the desired mount of control of the throttle valve 10 or the desired position of the throttle valve 10, and outputs the drive signal to the stepping motor 6. The stepping motor 6 is driven by the output signal of the ECU so that the degree of opening of the throttle valve 10 (that is, the position of the throttle valve 10) is controlled in response to the degree of depression of the accelerator pedal. The control of the degree of opening of the throttle valve 10 results in adjustment of the rate of air flow into the combustion chambers of the engine.

In the prior-art system of FIG. 1, since the degree of opening of the throttle valve 10 is adjusted by the stepping motor 6, an idle engine speed can be controlled via the throttle valve 10 without providing an exclusive valve (an ISC control valve) for controlling the idle engine speed. It should be noted that "engine speed" means the rotational speed of the crankshaft (the output shaft) of the engine.

The CPU 1 operates in accordance with a program stored in an internal ROM (read only memory). The program is designed to execute processes indicated later.

While the engine is idling, the CPU 1 functions to control the degree of opening of the throttle valve 10 to equalize the actual engine speed and a target engine speed. For the control of the throttle valve 10, the CPU 1 outputs a control signal to a command circuit 21. The control signal is changeable between a high level state and a low level state.

The command circuit 21 includes a series combination of a switching device (a transistor) and a resistor which is connected between a positive power supply line 22 and a ground (a negative power supply line) 23. The switching device has a control terminal subjected to the output signal of the CPU 1. When the output signal of the CPU 1 assumes the low level state, the switching device falls into a conductive state so that the voltage at the junction (the point) "A" between the resistor and the switching device drops to approximately 0 volt. When the output signal of the CPU 1 assumes the high level state, the switching device falls into a non-conductive state so that the voltage at the point "A" rises to approximately a positive power supply voltage. The voltage at the point "A" is transmitted to a comparator 3 as an indication of a command value of a current through the stepping motor 6.

A series combination of a power MOS FET 5, a winging (a coil) in the stepping motor 6, and a resistor 4 is connected between a positive power supply line 12 and a ground (a negative power supply line) 13. The power MOS FET 5 serves as a switching device. The resistor 4 serves to sense an actual current through the stepping motor 6. The voltage at the junction (the point) "B" between the motor coil and the resistor 4 indicates the actual value of the current through the stepping motor 6. The voltage at the point "B" is transmitted to the comparator 3.

The output terminal of the comparator 3 is connected to the gate of the power MOS FET 5. The device 3 compares the voltage at the point "A" and the voltage at the point "B", that is, compares the command current value and the actual current value. When the voltage at the point "A" is equal to or greater than the voltage at the point "B", that is, when the command current value is equal to or greater than the actual current value, the comparator 3 turns on the power MOS FET 5 so that a current flows through the stepping motor 6 from the positive power supply line 12. When the voltage at the point "A" is lower than the voltage at the point "B", that is, when the command current value is smaller than the actual current value, the comparator 3 turns off the power MOS FET 5 so that a current does not flow through the stepping motor 6 from the positive power supply line 12.

The current which has passed through the stepping motor 6 flows to the ground 13 via the current sensing resistor 4. As previously described, the voltage at the point "B" indicates the actual value of the current through the stepping motor 6. The device 3 compares the voltage at the point "B" with the voltage at the point "A" which indicates the command current value. The comparator 3 turns on and off the power MOS FET 5 in response to the result of the voltage comparison.

In general, the power MOS FET 5 is periodically turned on and off, and the voltage at the point "B" is periodically varied. The comparator 3, the power MOS FET 5, the stepping motor 6, and the junction "B" between the stepping motor 6 and the current sensing resistor 4 compose a feedback control loop which serves to equalize the voltage at the point "B" and the voltage at the point "A" in time average. Therefore, in time average, the actual value of the current through the stepping motor 6 is maintained at approximately the command value of the current through the stepping motor 6.

The stepping motor 6 includes a plurality of stator windings (stator coils) of different phases referred to as an A-phase, a B-phase, a C-phase, and a D-phase respectively.

The command circuit 21, the comparator 3, the current sensing resistor 4, and the power MOS FET 5 compose an A-phase circuit connected to the A-phase stator winding of the stepping motor 6. A B-phase circuit, a C-phase circuit, and a D-phase circuit similar to the A-phase circuit are connected to the B-phase stator winding, the C-phase stator winding, and the D-phase stator winding of the stepping motor 6 respectively. The CPU 1 output control signals to the command circuits 21 in the A-phase circuit, the B-phase circuit, the C-phase circuit, and the D-phase circuit respectively.

Specifically, the CPU 1 selects one or two of the A-phase circuit, the B-phase circuit, the C-phase circuit, and the D-phase circuit, and feeds an active control signal or active control signals to the command circuit 21 or the command circuits 21 in selected one or selected two of the A-phase circuit, the B-phase circuit, the C-phase circuit, and the D-phase circuit. As a result, the stepping motor 6 is activated and hence the output shaft of the stepping motor 6 is rotated, and the position of the output shaft of the stepping motor 6 is controlled at a desired position.

The output shaft of the stepping motor 6 is coupled with the shaft of the throttle valve 10 via gears so that rotation of the stepping motor 6 opens and closes the throttle valve 10. As the throttle valve 10 is opened and closed, the rate of air flow into the engine combustion chambers is varied.

The degree of opening of the throttle valve 10, that is, the position of the throttle valve 10, is detected by a throttle sensor 7. An analog signal representative of the degree of opening of the throttle valve 10 (that is, the position of the throttle valve 10) is outputted from the throttle sensor 7 to an A/D (analog-to-digital) converter 8. The analog throttle-position signal is converted by the A/D converter 8 into a corresponding digital throttle-position signal. The A/D converter 8 outputs the digital throttle-position signal to the CPU 1. Therefore, the CPU 1 is informed of the actual degree of opening of the throttle valve 10, that is, the actual position of the throttle valve 10.

Figure 2:
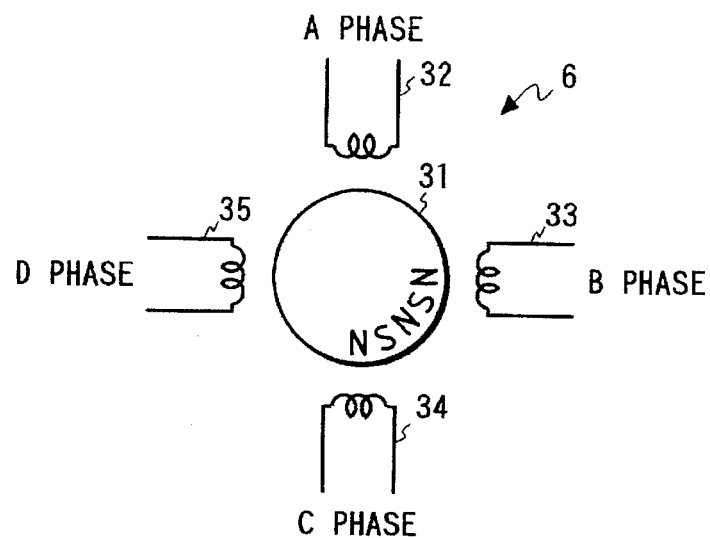
FIG. 2 is a diagram of a stepping motor in the prior-art system of FIG. 1.

As shown in FIG. 2, the stepping motor 6 includes a rotor 31 made of a permanent magnet. The motor output shaft is connected to the rotor 31 so that the motor output shaft rotates together with the rotor 31. In addition, the stepping motor 6 includes an A-phase stator winding 32, a B-phase stator winding 33, a C-phase stator winding 34, and a D-phase stator winding 35 which are arranged around the rotor 31 at equal angular intervals, that is, 90° intervals.

The rotor 31 is magnetized alternately between N poles and S poles at equal intervals along a circumferential direction thereof. The total number of the N poles and the S poles on the rotor 31 is equal to, for example, fifty. The rotor 31 rotates when one or adjacent two of the A-phase stator winding 32, the B-phase stator winding 33, the C-phase stator winding 34, and the D-phase stator winding 35 are energized by drive currents. It should be noted that the energized stator winding or windings generate magnetic fields which act on the permanent magnet of the rotor 31. A basic step angle (a unit step angle) is defined as corresponding to an angle by which the rotor 31 moves in response to a change of an energized stator winding from one to next one of the A-phase stator winding 32, the B-phase stator winding 33, the C-phase stator winding 34, and the D-phase stator winding 35.

Figure 3:
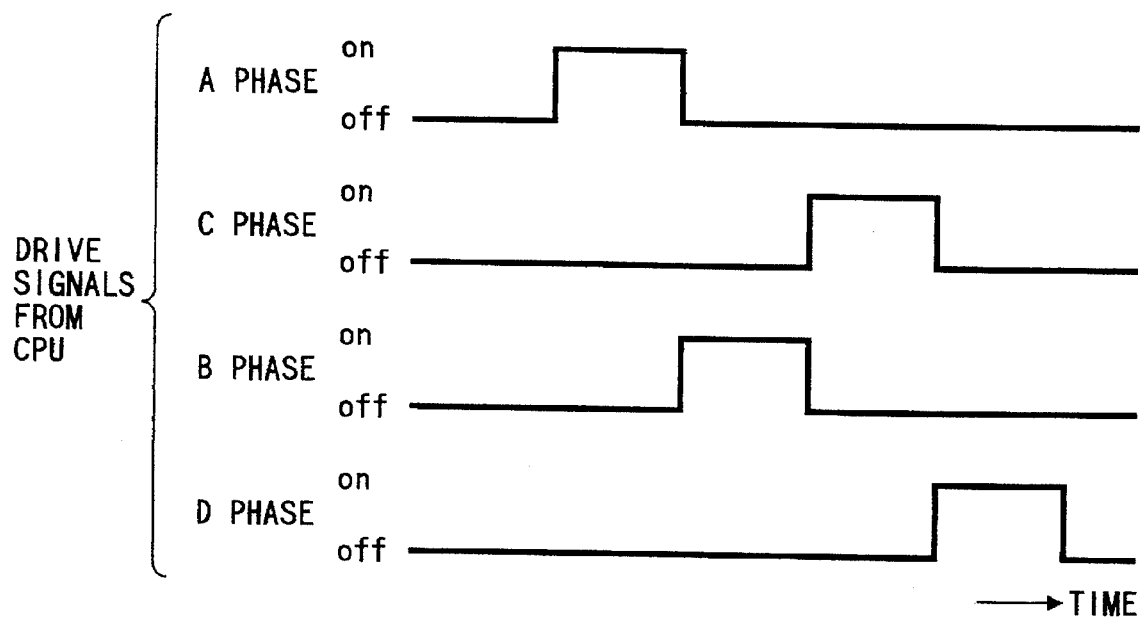
FIG. 3 is a time-domain diagram of signals in the prior-art system of FIG. 1.

FIG. 3 shows an example of a time-domain pattern of the control signals outputted from the CPU 1 to the A-phase circuit, the B-phase circuit, the C-phase circuit, and the D-phase circuit respectively. With reference to FIG. 3, when each of the control signals assumes an on state (a high level state), a drive current is fed to the related stator winding of the stepping motor 6. On the other hand, when each of the control signals assumes an off state (a low level state), the feed of a drive current to the related stator winding is inhibited.

During the rotation of the output shaft of the stepping motor 6, the CPU 1 changes the states of the control signals to the A-phase circuit, the B-phase circuit, the C-phase circuit, and the D-phase circuit in a manner such as shown by FIG. 3. With reference to FIG. 3, the control signals related to the A-phase stator winding 32, the B-phase stator winding 33, the C-phase stator winding 34, and the D-phase stator winding 35 are sequentially changed to and from the on states so that the A-phase stator winding 32, the B-phase stator winding 33, the C-phase stator winding 34, and the D-phase stator winding 35 are sequentially energized.

In general, a basic step angle (one step of rotation of the output shaft) of the stepping motor 6 is equal to an angle of 1.8° or 3.6°. Such a basic step angle tends to cause an insufficient resolution of the position of the throttle valve 10 which results in hunting of the control of the Idle engine speed. The resolution of the position of the throttle valve 10 is enhanced by increasing the speed reduction ratio of the gears between the output shaft of the stepping motor 6 and the shaft of the throttle valve 10. Response characteristics of the throttle valve 10 deteriorate as the speed reduction ratio of the gears increases.

Embodiment

Figure 4:
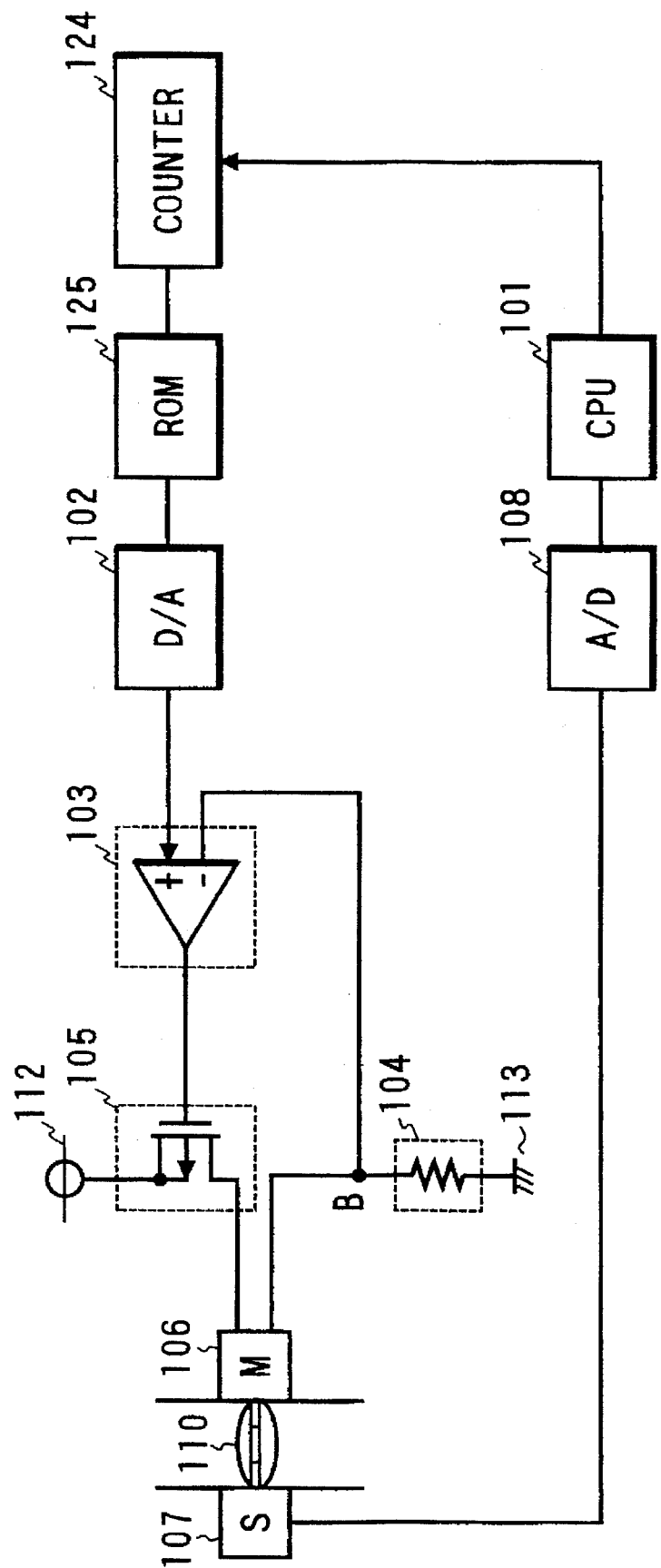
FIG. 4 is a diagram of an electronic throttle system for an internal combustion engine according to an embodiment of this invention.

FIG. 4 shows an electronic throttle system for an internal combustion engine according to an embodiment of this invention. For example, the internal combustion engine powers a vehicle. With reference to FIG. 4, a throttle valve 110 is rotatably disposed in an air induction passage of the engine to adjustably determine the rate of air flow into combustion chambers of the engine. A stepping motor 106 serves to drive the throttle valve 110. As will be described later, the stepping motor 106 is controlled by an electronic control unit (ECU) including a CPU 101 and a drive circuit for the stepping motor 106.

Figure 5:
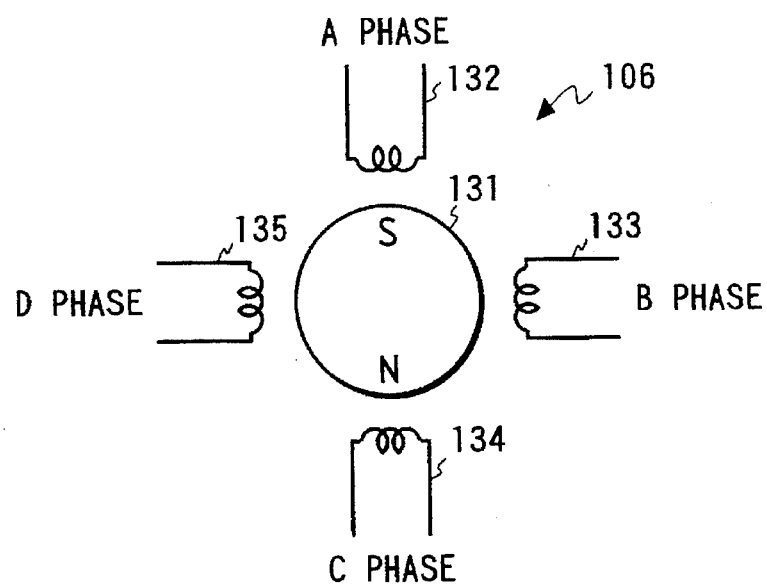
FIG. 5 is a diagram of a stepping motor in the system of FIG. 4.

As shown in FIG. 5, the stepping motor 106 includes a rotor 131 made of a permanent magnet. The output shaft of the stepping motor 106 is connected to the rotor 131 so that the motor output shaft rotates together with the rotor 131. In addition, the stepping motor 106 includes an A-phase stator winding 132, a B-phase stator winding 133, a C-phase stator winding 134, and a D-phase stator winding 135 which are arranged around the rotor 31 at equal angular intervals, that is, 90° intervals.

The rotor 131 is magnetized so that an N pole and an S pole are formed at diametrically opposed positions respectively. Thus, the N pole and the S pole on the rotor 131 are spaced at an angular interval of 180°. In this case, a basic step angle (a unit step angle) of the stepping motor 106 is equal to 90°.

It should be noted that the rotor 131 may be designed similarly to the rotor 31 of FIG. 2. In this case, the basic step angle (the unit step angle) of the stepping motor 106 is equal to 1.8°.

During the control of the stepping motor 106, drive currents are fed to neighboring two (adjacent two) of the A-phase stator winding 132, the B-phase stator winding 133, the C-phase stator winding 134, and the D-phase stator winding 135.

Figure 6:
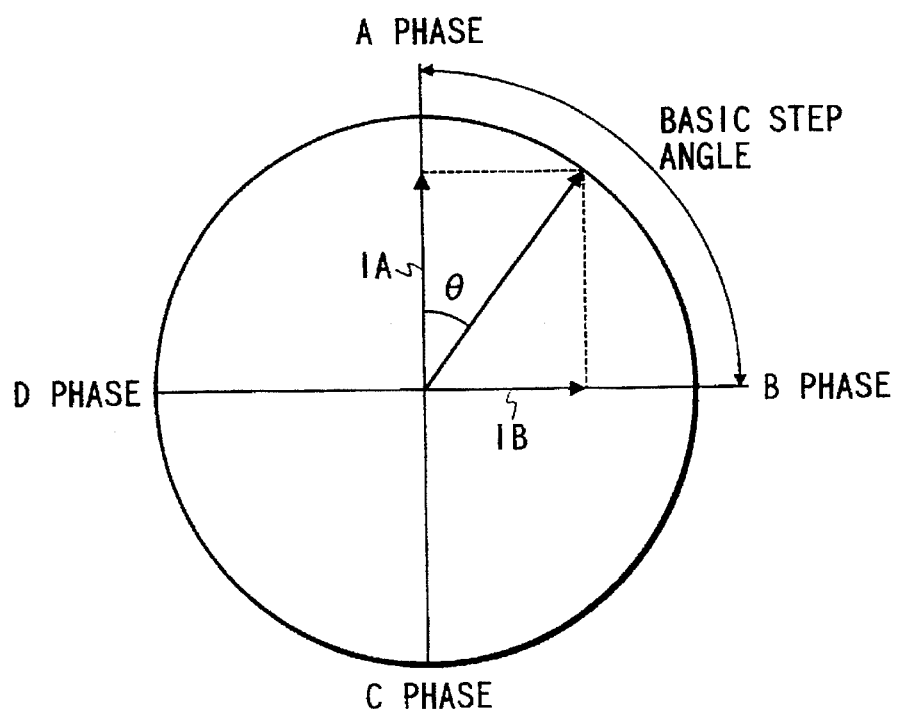
FIG. 6 is a diagram of the relation among the angular position of the output shaft of the stepping motor, and A-phase and B-phase drive currents fed to the stepping motor in the system of FIG. 4.

The angular position of the rotor 131, that is, the angular position of the output shaft of the stepping motor 106, is denoted by the character "θ". As shown in FIG. 6, four equally-spaced angular positions of the output shaft of the stepping motor 106 correspond to the A-phase stator winding 132, the B-phase stator winding 133, the C-phase stator winding 134, and the D-phase stator winding 135 respectively. These four angular positions are referred to as the A-phase point, the B-phase point, the C-phase point, and the D-phase point respectively. In FIG. 6, the angular position θ of the output shaft of the stepping motor 106 is defined as an angle measured from the A-phase point along the clockwise direction.

To stop the output shaft of the stepping motor 106 at an angular position θ between the A-phase point and the B-phase point (θ=0°~90°), drive currents IA and IB are fed to the A-phase stator winding 132 and the B-phase stator winding 133 respectively. The magnitudes of the drive currents IA and IB are set as IA=I·cosθ and IB=I·sinθ where "I" denotes a predetermined current value or a predetermined current constant. In addition, drive currents IC and ID are fed to the C-phase stator winding 134 and the D-phase stator winding 135 respectively. The magnitudes of the drive currents IC and ID are set as IC=−I·cosθ and ID=−I·sinθ.

The angular position θ of the output shaft of the stepping motor 106 is changeable among predetermined angles spaced at equal intervals preferably smaller than the basic step angle (the unit step angle) of the stepping motor 106 which equals, for example, 90°. Specifically, the basic step angle, that is, 90°, is equally divided by a given natural number N preferably equal to 2 or more. The division-resultant step angle is referred to as a micro step angle which agrees with one unit in the change of the angular position θ of the output shaft of the stepping motor 106. For step-by-step adjustment of the angular position of the output shaft of the stepping motor 106, the drive currents IA, IB, IC, and ID to the A-phase stator winding 132, the B-phase stator winding 133, the C-phase stator winding 134, and the D-phase stator winding 135 are changed step by step corresponding to the micro step angle.

Figure 7:
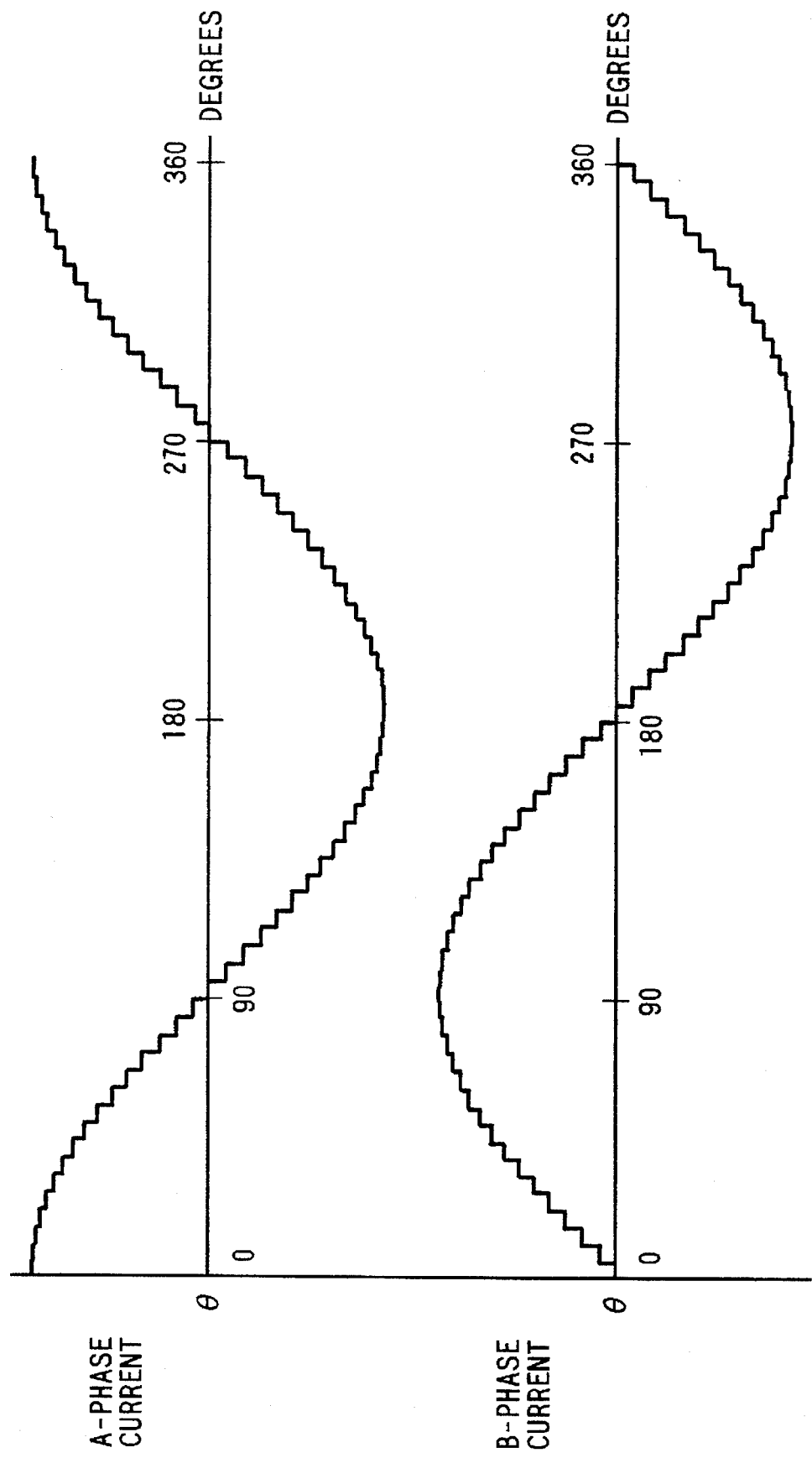
FIG. 7 is a diagram of the relation among the angular position of the output shaft of the stepping motor, the magnitude of the A-phase current, and the magnitude of the B-phase current in the system of FIG. 4.

FIG. 7 shows one example of the relation among the angular position θ of the output shaft of the stepping motor 106 and the magnitudes of the drive currents IA and IB which are fed to the A-phase stator winding 132 and the B-phase stator winding 133 to move and hold the output shaft of the stepping motor 106 to and at the angular position θ. As shown in FIG. 7, the magnitudes of the drive currents IA and IB are varied stepwise in accordance with the angular position θ of the output shaft of the stepping motor 106. With regard to the example of FIG. 7, the micro step angle is set to 90°/16. As previously described, the magnitudes of the drive currents IA and IB to the A-phase stator winding 132 and the B-phase stator winding 133 are given as IA=I·cosθ and IB=I·sinθ.

The system of FIG. 4 will be further described. In the system of FIG. 4, an accelerator position sensor (not shown) associated with an accelerator pedal (not shown) outputs a signal representing the degree of depression of the accelerator pedal which is executed by a vehicle driver. The electronic control unit (ECU) including the CPU 101 and the drive circuit for the stepping motor 106 is informed of the output signal of the accelerator position sensor which represents the degree of depression of the accelerator pedal.

The ECU calculates the desired amount of control of the throttle valve 110 or the desired position of the throttle valve 110 in response to the degree of depression of the accelerator pedal. The ECU generates a drive signal in response to the desired amount of control of the throttle valve 110 or the desired position of the throttle valve 110, and outputs the drive signal to the stepping motor 106. The stepping motor 6 is driven by the output signal of the ECU so that the degree of opening of the throttle valve 110 (that is, the position of the throttle valve 110) is controlled in response to the degree of depression of the accelerator pedal. The control of the degree of opening of the throttle valve 110 results in adjustment of the rate of air flow into the combustion chambers of the engine.

In the system of FIG. 4, since the degree of opening of the throttle valve 110 is adjusted by the stepping motor 106, an idle engine speed can be controlled via the throttle valve 110 without providing an exclusive valve (an ISC control valve) for controlling the idle engine speed. It should be noted that "engine speed" means the rotational speed of the crankshaft (the output shaft) of the engine.

The CPU 101 operates in accordance with a program stored in an internal ROM. The program is designed to execute processes indicated later. While the engine is idling, the CPU 101 functions to control the degree of opening of the throttle valve 110 to equalize the actual engine speed and a target engine speed. For the control of the throttle valve 110, the CPU 101 outputs a drive pulse signal to a binary counter 124. The drive pulse signal outputted from the CPU 101 indicates a desired angular position of the output shaft of the stepping motor 106 which corresponds to a desired position of the throttle valve 110 (a desired degree of opening of the throttle valve 110). The desired angular position of the output shaft of the stepping motor 106 is expressed in unit of micro step angle which results from the division of the basic step angle by the number N. Specifically, the drive pulse signal outputted from the CPU 101 has a train of successive pulses, the total number of which depends on the desired angular position of the output shaft of the stepping motor 106.

Pulses in the drive pulse signal outputted from the CPU 101 are counted by the binary counter 124. The binary counter 124 outputs a signal representing the total number of pulses in the drive pulse signal outputted from the CPU 101. The output signal of the binary counter 124 is fed to a ROM (read only memory) 125 as an address signal. Signals (data pieces) representing different command values of a current through the stepping motor 106 are previously stored in different storage segments of the ROM 125 which are designated by different addresses respectively. One signal representing one command current value is read out from the storage segment of the ROM 125 which is designated by the address signal fed from the binary counter 124. The output signal of the ROM 125 is changed by a D/A (digital-to-analog) converter 102 into a corresponding analog (voltage) signal which represents the command current value. The D/A converter 102 outputs the analog signal which is transmitted to a comparator 103 as an indication of the command value of the current through the stepping motor 106.

A series combination of a power MOS FET 105, a winging (a coil) in the stepping motor 106, and a resistor 104 is connected between a positive power supply line 112 and a ground (a negative power supply line) 113. The power MOS FET 105 serves as a switching device. The resistor 104 serves to sense an actual current through the stepping motor 106. The voltage at the junction (the point) "B" between the motor coil and the resistor 104 indicates the actual value of the current through the stepping motor 106. The voltage at the point "B" is transmitted to the comparator 103.

The output terminal of the comparator 103 is connected to the gate of the power MOS FET 105. The device 103 compares the voltage outputted from the D/A converter 102 and the voltage at the point "B", that is, compares the command current value and the actual current value. When the voltage outputted from the D/A converter 102 is equal to or greater than the voltage at the point "B", that is, when the command current value is equal to or greater than the actual current value, the comparator 103 turns on the power MOS FET 105 so that a current flows through the stepping motor 106 from the positive power supply line 112. When the voltage outputted from the D/A converter 102 is lower than the voltage at the point "B", that is, when the command current value is smaller than the actual current value, the comparator 103 turns off the power MOS FET 105 so that a current does not flow through the stepping motor 106 from the positive power supply line 112.

The current which has passed through the stepping motor 106 flows to the ground 113 via the current sensing resistor 104. As previously described, the voltage at the point "B" indicates the actual value of the current through the stepping motor 106. The device 103 compares the voltage at the point "B" with the output voltage from the D/A converter 102 which indicates the command current value. The comparator 103 turns on and off the power MOS FET 105 in response to the result of the voltage comparison.

In general, the power MOS FET 105 is periodically turned on and off, and the voltage at the point "B" is periodically varied. The comparator 103, the power MOS FET 105, the stepping motor 106, and the junction "B" between the stepping motor 106 and the current sensing resistor 104 compose a feedback control loop which serves to equalize the voltage at the point "B" and the output voltage from the D/A converter 102 in time average. Therefore, in time average, the actual value of the current through the stepping motor 106 is maintained at approximately the command value of the current through the stepping motor 106.

As previously described, the stepping motor 106 includes a plurality of stator windings (stator coils) of different phases referred to as an A-phase, a B-phase, a C-phase, and a D-phase respectively. The binary counter 124, the ROM 125, the D/A converter 102, the comparator 103, the current sensing resistor 104, and the power MOS FET 105 compose an A-phase circuit connected to the A-phase stator winding of the stepping motor 106. A B-phase circuit, a C-phase circuit, and a D-phase circuit similar to the A-phase circuit are connected to the B-phase stator winding, the C-phase stator winding, and the D-phase stator winding of the stepping motor 106 respectively. The CPU 101 output drive pulse signals to the A-phase circuit, the B-phase circuit, the C-phase circuit, and the D-phase circuit respectively.

The drive pulse signals outputted from the CPU 101 to the A-phase circuit, the B-phase circuit, the C-phase circuit, and the D- circuit are designed so that drive currents IA, IB, IC, and ID will be fed to the A-phase stator winding 132, the B-phase stator winding 133, the C-phase stator winding 134, and the D-phase stator winding 135 respectively. As previously described, the magnitudes of the drive currents IA and IB are set as IA=I·cos$\theta$ and IB=I·sin$\theta$ where "$\theta$" denotes a target angular position (a desired angular position) of the output shaft of the stepping motor 106. In addition, the magnitudes of the drive currents IC and ID are set as IC=−I·cos$\theta$ and ID=−I·sin$\theta$. As a result, the stepping motor 106 is activated and hence the output shaft of the stepping motor 106 is rotated, and the position of the output shaft of the stepping motor 106 is controlled at the desired position $\theta$ which is expressed in unit of the micro step angle.

The output shaft of the stepping motor 106 is coupled with the shaft of the throttle valve 110 via gears so that rotation of the stepping motor 106 opens and closes the throttle valve 110. As the throttle valve 110 is opened and closed, the rate of air flow into the engine combustion chambers is varied.

The degree of opening of the throttle valve 110, that is, the position of the throttle valve 110, is detected by a throttle sensor 107. An analog signal representative of the degree of opening of the throttle valve 110 (the position of the throttle valve 110) is outputted from the throttle sensor 107 to an A/D converter 108. The analog throttle-position signal is converted by the A/D converter 108 into a corresponding digital throttle-position signal. The A/D converter 108 outputs the digital throttle-position signal to the CPU 101. Therefore, the CPU 101 is informed of the actual degree of opening of the throttle valve 110, that is, the actual position of the throttle valve 110. The CPU 101 calculates the difference between the actual position of the throttle valve 110 and the desired position of the throttle valve 110, and adjusts the drive pulse signals to the binary counters 124 in response to the calculated difference between the actual position of the throttle valve 110 and the desired position of the throttle valve 110. This design enables the actual position of the throttle valve 110 to be controlled at the desired position by a feedback loop.

Figure 8:
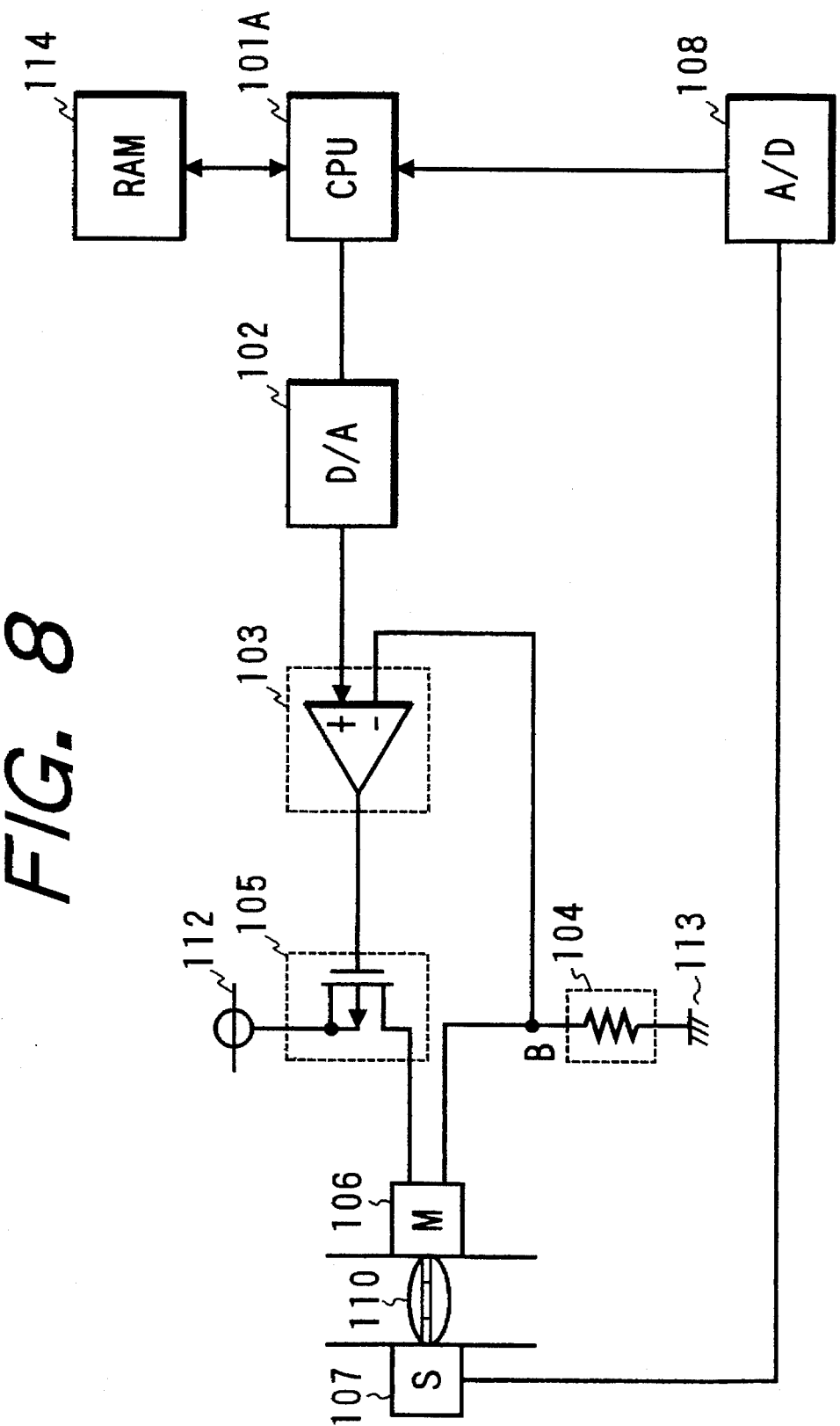
FIG. 8 is a diagram of a modified electronic throttle system for an internal combustion engine according to this invention.

FIG. 8 shows a modification of the system of FIG. 4. The modified system of FIG. 8 is similar to the system of FIG. 4 except for design changes indicated hereinafter. The modified system of FIG. 8 includes a CPU 101A instead of the CPU 101 of FIG. 4. While an internal combustion engine is idling, the CPU 101A serves to control the degree of opening of a throttle valve 110 (that is, the position of the throttle valve 110) to maintain an engine speed at a desired engine speed or a target engine speed.

When a command to drive the throttle valve 110 is generated, the CPU 101A reads out digital signals (data pieces) of command values of A-phase and B-phase drive currents from a RAM (random access memory) 114 and outputs the readout digital signals to D/A converters 102. The RAM 114 is always activated by a suitable power supply such as a backup power supply. The digital signals of the command values of the A-phase drive current and the B-phase drive current are changed by the D/A converters 102 into corresponding analog signals which are applied to comparators 103.

Drive currents corresponding to the command values are actually fed to an A-phase stator winding and a B-phase stator winding in a stepping motor 106A in a way similar to the way executed in the system of FIG. 4. Thus, the stepping motor 106A is driven so that the output shaft thereof can assume a desired angular position. The output shaft of the stepping motor 106A is coupled with the shaft of the throttle valve 110 in a manner such that the output shaft of the stepping motor 106A and the shaft of the throttle valve 110 can rotate together at equal angular velocities. Thus, the angular position of the throttle valve 110 can be regarded as being equal to the angular position of the output shaft of the stepping motor 106A.

FIG. 9 shows a portion of a table of the relation among the angular position of the throttle valve 110 (that is, the degree of opening of the throttle valve 110) and initial command values of A-phase and B-phase drive currents. The command current value table in FIG. 9 is represented by data stored in the RAM 114. The stepping motor 106A is designed so that a basic step angle thereof is equal to, for example, 1.8°. The angular position θ of the throttle valve 110 is expressed in unit of a micro step angle equal to the basic step angle divided by a given number N (for example, 18). The micro step angle is equal to, for example, 0.1°. The command values IA and IB of the A-phase drive current and the B-phase drive current with respect to every angular position θ of the throttle valve 110 are set according to equations as $IA = I \cdot \cos\theta$ and $IB = I \cdot \sin\theta$.

Figure 10:
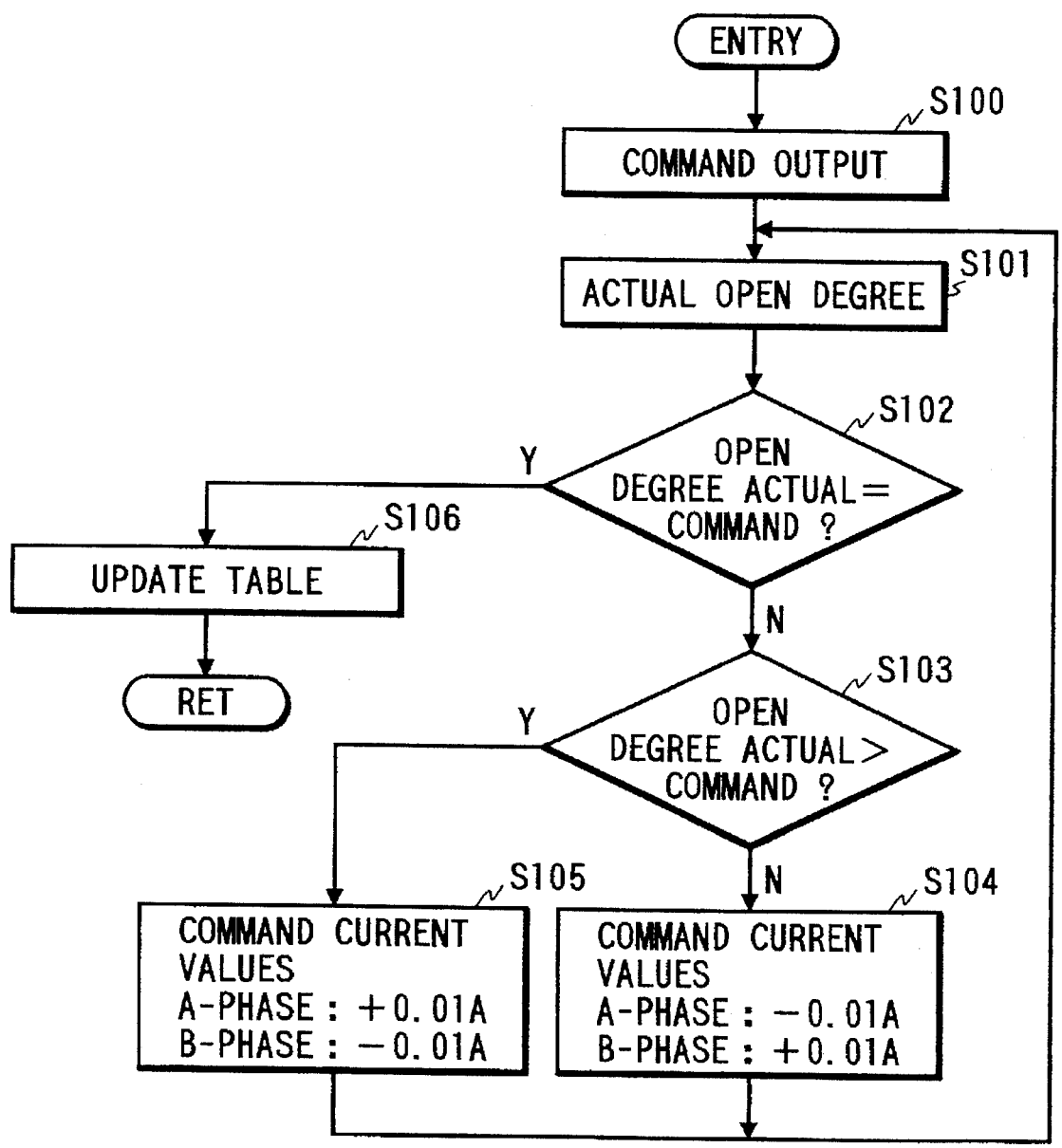
FIG. 10 is a flowchart of a segment of a program for controlling a CPU in the system of FIG. 8.

The CPU 101A operates in accordance with a program stored in an internal ROM. FIG. 10 is a flowchart of a segment of the program which relates to table correction using a learning process. The program segment in FIG. 10 is executed once when an engine ignition switch (not shown) is changed to an on position. The program segment in FIG. 10 may be executed while the throttle valve 110 remains closed, for example, while the engine is idling.

With reference to FIG. 10, a first step S100 of the program segment generates a signal which represents a requirement for movement of the throttle valve 110 to a preset angular position, for example, a position corresponding to an angle of 0.2° in a direction from an A-phase point toward a B-phase point. The step S100 reads out digital signals (data pieces) of command values of A-phase and B-phase drive currents from the table in the RAM 114 in response to the required angular position of the throttle valve 110. In the case where the required angular position of the throttle valve 110 agrees with 0.2°, the command values of the A-phase drive current and the B-phase drive current which are represented by the digital signals read out from the RAM 114 are equal to 3.43 A and 0.68 A respectively (see FIG. 9). The step S100 outputs the digital signals of the command values of the A-phase drive current and the B-phase drive current to the D/A converters 102. As a result, drive currents corresponding to the command values are actually fed to the A-phase stator winding and the B-phase stator winding in the stepping motor 106A respectively. After the step S100, the program advances to a step S101.

The step S101 derives the actual angular position of the throttle valve 110 by referring to the output signal of a throttle sensor 107.

A step S102 following the step S101 determines whether or not the actual angular position of the throttle valve 110 is equal to a command angular position of the throttle valve 110 which agrees with the required angular position thereof. When the actual angular position of the throttle valve 110 is not equal to the command angular position of the throttle valve 110, the program advances from the step S102 to a step S103. When the actual angular position of the throttle valve 110 is equal to the command angular position of the throttle valve 110, the program advances from the step S102 to a step S106.

The step S103 compares the actual angular position of the throttle valve 110 with the command angular position of the throttle valve 110. When the actual angular position of the throttle valve 110 is not greater than the command angular position of the throttle valve 110, the program advances from the step S103 to a step S104. When the actual angular position of the throttle valve 110 is greater than the command angular position of the throttle valve 110, the program advances from the step S103 to a step S105.

The step S104 corrects the command values of the A-phase drive current and the B-phase drive current. Specifically, the step S104 decrements the command value of the A-phase drive current by a value of 0.01 A, and increments the command value of the B-phase drive current by a value of 0.01 A. The step S104 outputs signals representative of the correction-resultant command current values to the D/A converters 102. As a result, the drive currents fed to the A-phase stator winding and the B-phase stator winding in the stepping motor 106A are decremented and incremented respectively so that the throttle valve 110 will rotate toward a lager angle side. After the step S104, the program returns to the step S101.

The step S105 corrects the command values of the A-phase drive current and the B-phase drive current. Specifically, the step S105 increments the command value of the A-phase drive current by a value of 0.01 A, and decrements the command value of the B-phase drive current by a value of 0.01 A. The step S105 outputs signals representative of the correction-resultant command current values to the D/A converters 102. As a result, the drive currents fed to the A-phase stator winding and the B-phase stator winding in the stepping motor 106A are incremented and decremented respectively so that the throttle valve 110 will rotate toward a smaller angle side. After the step S105, the program returns to the step S101.

A loop of the steps S101, S102, S103, S104, and S105 is reiterated until the actual angular position of the throttle valve 110 becomes equal to the command angular position of the throttle valve 110. A learning process is implemented by the steps S101, S102, S103, S104, S105, and S106.

As previously described, when the actual angular position of the throttle valve 110 is equal to the command angular position of the throttle valve 110, the program advances from the step S102 to the step S106. The step S106 updates the command current values in the table in the RAM 114 according to the latest command values of the A-phase drive current and the B-phase drive current. Specifically, the step S106 replaces the command current values in the table with the latest command values of the A-phase drive current and the B-phase drive current. After the step S106, the program exits from the program segment and then returns to a main routine (not shown).

Figure 11:
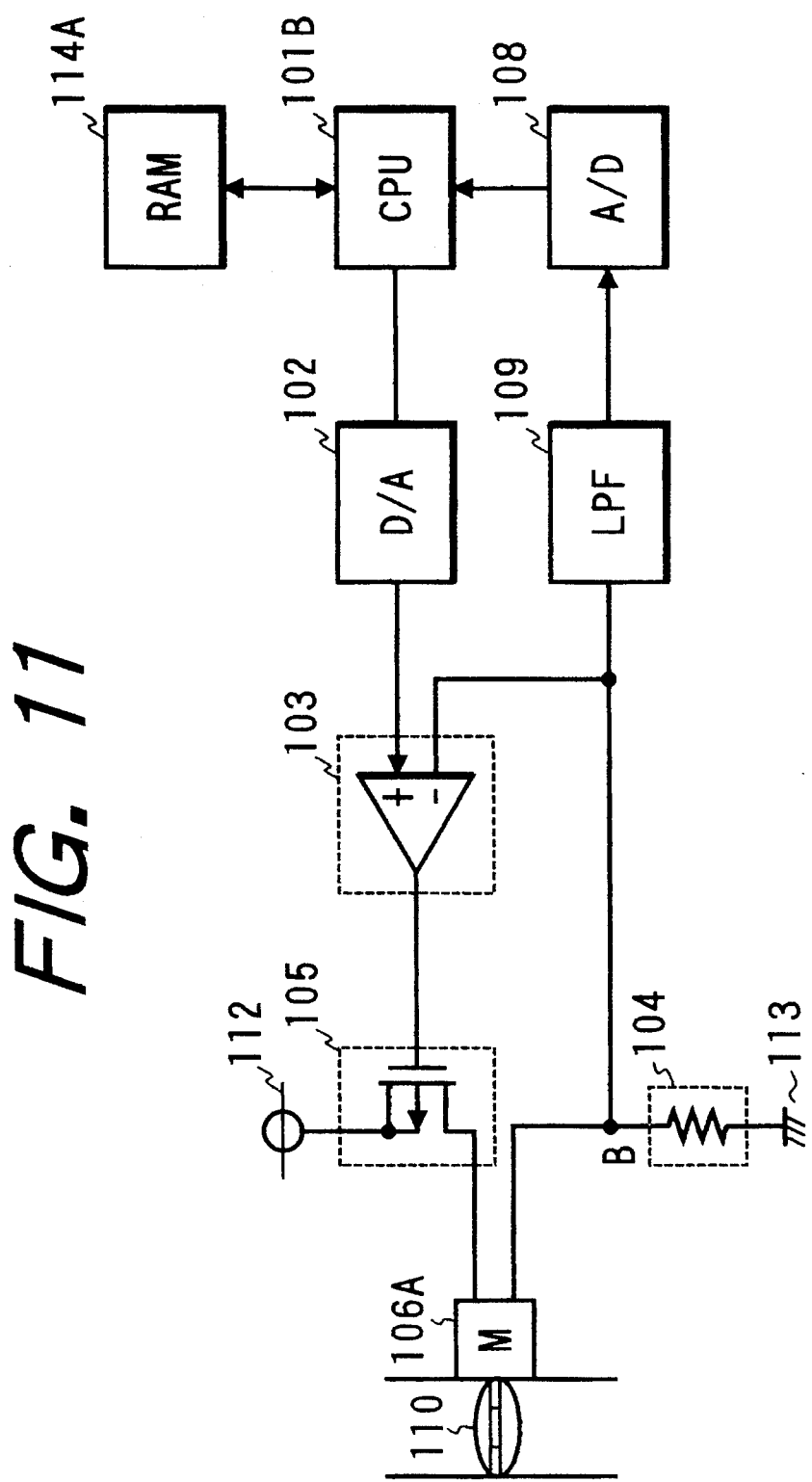
FIG. 11 is a diagram of a modified electronic throttle system for an internal combustion engine according to this invention.

FIG. 11 shows a modification of the system of FIG. 4. The modified system of FIG. 11 is similar to the system of FIG. 4 except for design changes indicated hereinafter. The modified system of FIG. 11 includes a CPU 101B instead of the CPU 101 of FIG. 4. While an internal combustion engine is idling, the CPU 101B serves to control the degree of opening of a throttle valve 110 (that is, the position of the throttle valve 110) to maintain an engine speed at a desired engine speed or a target engine speed.

In the system of FIG. 11, a voltage at a junction "B" between a stator winding in a stepping motor 106A and a current sensing resistor 104 is transmitted via a low pass filter (LPF) 109 to an A/D converter 108 as an indication of an actual value of a current through the stator winding in the stepping motor 106A. The LPF 109 temporally averages the signal voltage applied to the A/D converter 108 to increase the reliability of the signal voltage. The signal voltage is changed by the A/D converter 108 into a corresponding digital signal representing the actual value of the current through the stator winding in the stepping motor 106A. The A/D converter 108 outputs the resultant digital signal to the CPU 101B.

When a command to drive the throttle valve 110 is generated, the CPU 101B reads out digital signals (data pieces) of command values of A-phase and B-phase drive currents from a RAM (random access memory) 114A and outputs the readout digital signals to D/A converters 102. The RAM 114A is always activated by a suitable power supply such as a backup power supply. The digital signals of the command values of the A-phase drive current and the B-phase drive current are changed by the D/A converters 102 into corresponding analog signals which are applied to comparators 103.

Drive currents corresponding to the command values are actually fed to an A-phase stator winding and a B-phase stator winding in the stepping motor 106A in a way similar to the way executed in the system of FIG. 4. Thus, the stepping motor 106A is driven so that the output shaft thereof can assume a desired angular position. The output shaft of the stepping motor 106A is coupled with the shaft of the throttle valve 110 in a manner such that the output shaft of the stepping motor 106A and the shaft of the throttle valve 110 can rotate together at equal angular velocities. Thus, the angular position of the throttle valve 110 can be regarded as being equal to the angular position of the output shaft of the stepping motor 106A.

FIG. 12 shows a portion of a table of the relation among the angular position of the throttle valve 110 (that is, the degree of opening of the throttle valve 110), initial command values of A-phase and B-phase drive currents, and target values of A-phase and B-phase drive currents. The command current value table in FIG. 12 is represented by data stored in the RAM 114A. The stepping motor 106A is designed so that a basic step angle thereof is equal to, for example, 1.8°. The angular position θ of the throttle valve 110 is expressed in unit of a micro step angle equal to the basic step angle divided by a given number N (for example, 18). The micro step angle is equal to, for example, 0.1°. The command values IA and IB of the A-phase drive current and the B-phase drive current with respect to every angular position θ of the throttle valve 110 are set according to equations as IA=I·cosθ and IB=I·sinθ.

Figure 13:
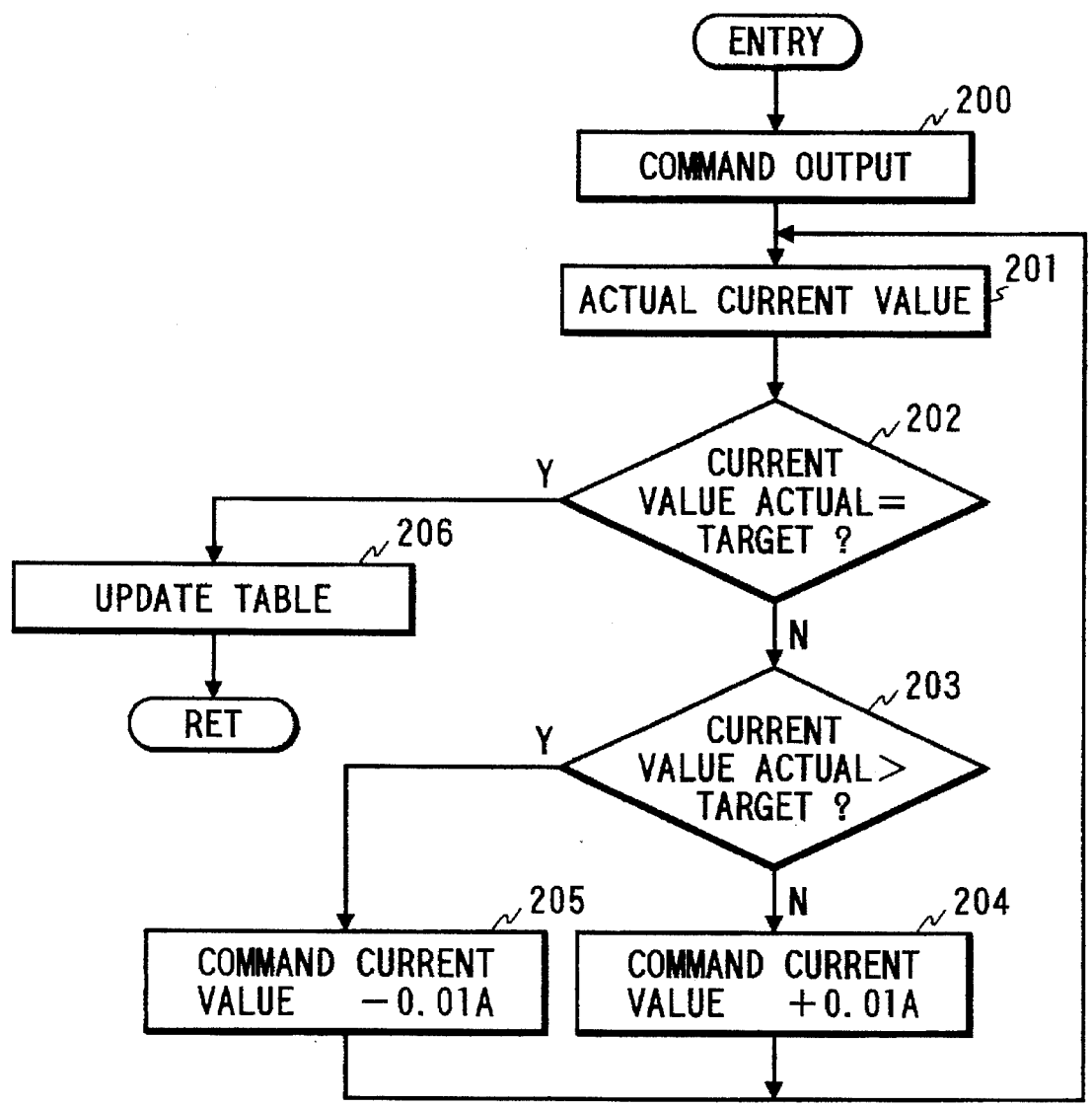
FIG. 13 is a flowchart of a segment of a program for controlling a CPU in the system of FIG. 11.

The CPU 101B operates in accordance with a program stored in an internal ROM. FIG. 13 is a flowchart of a segment of the program which relates to table correction using a learning process. The program segment in FIG. 13 is executed once when an engine ignition switch (not shown) is changed to an on position. The program segment in FIG. 13 may be executed while the throttle valve 110 remains closed, for example, while the engine is idling.

With reference to FIG. 13, a first step 200 of the program segment generates a signal which represents a requirement for movement of the throttle valve 110 to a preset angular position, for example, a position corresponding to an angle of 0.2° in a direction from an A-phase point toward a B-phase point. The step 200 reads out digital signals (data pieces) of command values or target values of A-phase and B-phase drive currents from the table in the RAM 114A in response to the required angular position of the throttle valve 110. In the case where the required angular position of the throttle valve 110 agrees with 0.2°, the command values or the target values of the A-phase drive current and the B-phase drive current which are represented by the digital signals read out from the RAM 114A are equal to 3.43 A and 0.68 A respectively (see FIG. 12). The step 200 outputs the digital signals of the command values (the target values) of the A-phase drive current and the B-phase drive current to the D/A converters 102. As a result, drive currents corresponding to the command values (the target values) are actually fed to the A-phase stator winding and the B-phase stator winding in the stepping motor 106A respectively. After the step 200, the program advances to a step 201.

The step 201 derives the actual values of the drive currents through the A-phase stator winding and the B-phase stator winding in the stepping motor 106A by referring to the output signals of the LPF's 109.

A step 202 following the step 201 determines whether or not the actual value is equal to the target value with respect to each of the drive currents through the A-phase stator winding and the B-phase stator winding. When at least one actual current value is not equal to the corresponding target current value, the program advances from the step 202 to a step 203. When the actual current values are equal to the target current values, the program advances from the step 202 to a step 206.

The step 203 compares the actual value and the target value with respect to each of the A-phase drive current and the B-phase drive current. When the actual current value is not greater than the target current value, the program advances from the step 203 to a step 204. When the actual current value is greater than the target current value, the program advances from the step 203 to a step 205.

The step 204 corrects the command value of at least one of the A-phase drive current and the B-phase drive current. Specifically, the step 204 increments the command current value by a value of 0.01 A. The step 204 outputs a signal representative of the correction-resultant command value to the D/A converter 102. As a result, at least one of the A-phase drive current and the B-phase drive current is incremented. After the step 204, the program returns to the step 201.

The step 205 corrects the command value of at least one of the A-phase drive current and the B-phase drive current. Specifically, the step 205 decrements the command current value by a value of 0.01 A. The step 205 outputs a signal representative of the correction-resultant command value to the D/A converter 102. As a result, at least one of the A-phase drive current and the B-phase drive current is decremented. After the step 205, the program returns to the step 201.

A loop of the steps 201, 202, 203, 204, and 205 is reiterated until the actual values of the A-phase drive current and the B-phase drive current become equal to the target values of the A-phase drive current and the B-phase drive current respectively. A learning process is implemented by the steps 201, 202, 203, 204, 205, and 206.

As previously described, when the actual current values of the A-phase drive current and the B-phase drive current are equal to the target current values of the A-phase drive current and the B-phase drive current respectively, the program advances from the step 202 to the step 206. The step 206 updates the command current values in the table in the RAM 114A according to the latest command values of the A-phase drive current and the B-phase drive current. Specifically, the step 206 replaces the command current values in the table with the latest command values of the A-phase drive current and the B-phase drive current. After the step 206, the program exits from the program segment and then returns to a main routine (not shown).

Figure 14:
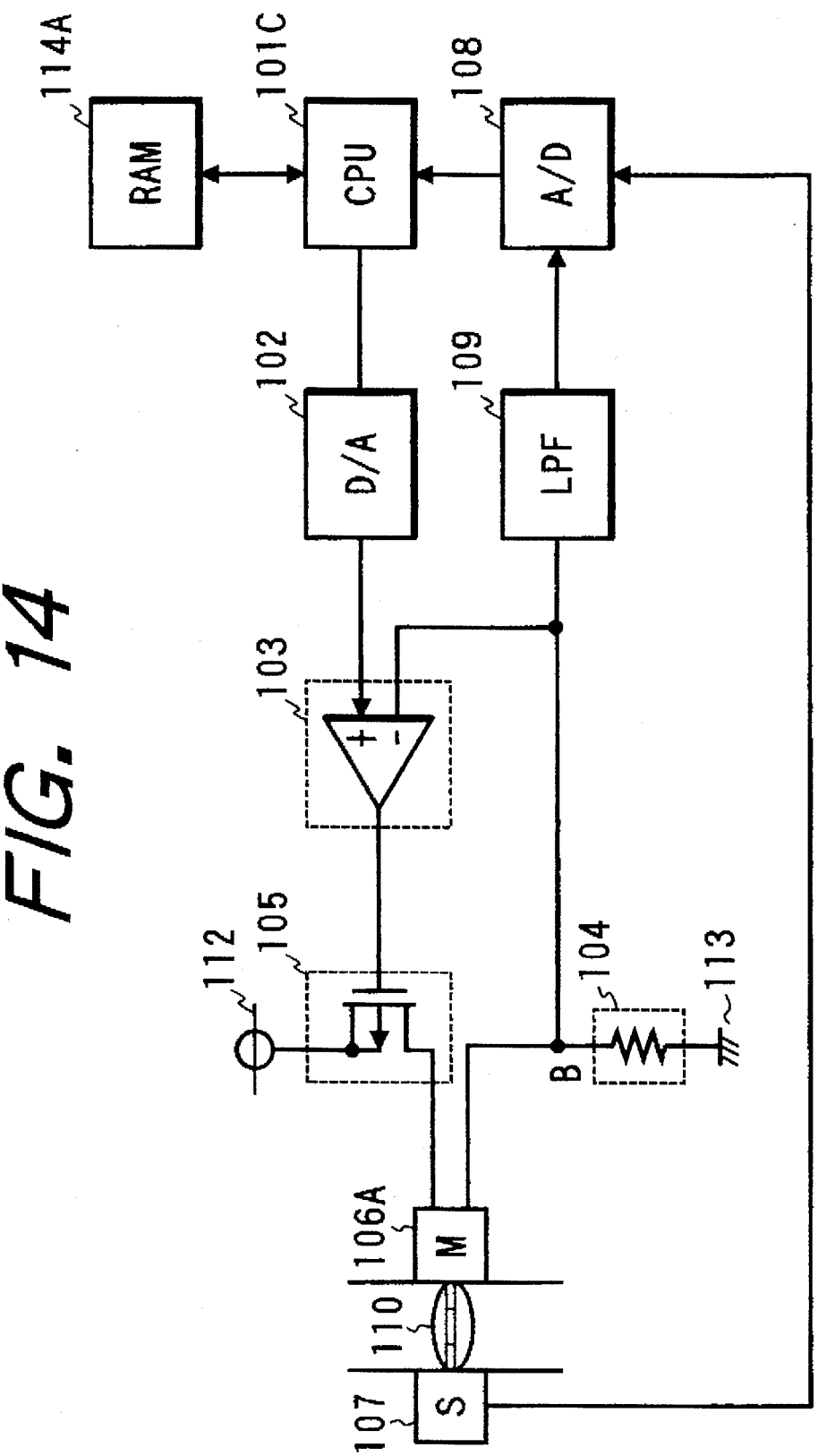
FIG. 14 is a diagram of a modified electronic throttle system for an internal combustion engine according to this invention.

FIG. 14 shows a modification of the system of FIG. 4. The modified system of FIG. 14 is similar to the system of FIG. 4 except for design changes indicated hereinafter. The modified system of FIG. 14 includes a CPU 101C instead of the CPU 101 of FIG. 4. While an internal combustion engine is idling, the CPU 101C serves to control the degree of opening of a throttle valve 110 (that is, the position of the throttle valve 110) to maintain an engine speed at a desired engine speed or a target engine speed.

In the system of FIG. 14, a voltage at a junction "B" between a stator winding in a stepping motor 106A and a current sensing resistor 104 is transmitted via a low pass filter (LPF) 109 to an A/D converter 108 as an indication of an actual value of a current through the stator winding in the stepping motor 106A. The LPF 109 temporally averages the signal voltage applied to the A/D converter 108 to increase the reliability of the signal voltage. The signal voltage is changed by the A/D converter 108 into a corresponding digital signal representing the actual value of the current through the stator winding in the stepping motor 106A. The A/D converter 108 outputs the resultant digital signal to the CPU 101C.

When a command to drive the throttle valve 110 is generated, the CPU 101C reads out digital signals (data pieces) of command values of A-phase and B-phase drive currents from a RAM (random access memory) 114A and outputs the readout digital signals to D/A converters 102. The RAM 114A is always activated by a suitable power supply such as a backup power supply. The digital signals of the command values of the A-phase drive current and the B-phase drive current are changed by the D/A converters 102 into corresponding analog signals which are applied to comparators 103.

Drive currents corresponding to the command values are actually fed to an A-phase stator winding and a B-phase stator winding in a stepping motor 106A in a way similar to the way executed in the system of FIG. 4. Thus, the stepping motor 106A is driven so that the output shaft thereof can assume a desired angular position. The output shaft of the stepping motor 106A is coupled with the shaft of the throttle valve 110 in a manner such that the output shaft of the stepping motor 106A and the shaft of the throttle valve 110 can rotate together at equal angular velocities. Thus, the angular position of the throttle valve 110 can be regarded as being equal to the angular position of the output shaft of the stepping motor 106A.

The RAM 114A stores data representing a table of the relation among the angular position of the throttle valve 110 (that is, the degree of opening of the throttle valve 110), initial command values of A-phase and B-phase drive currents, and target values of A-phase and B-phase drive currents. The table is similar to that shown in FIG. 12. The stepping motor 106A is designed so that a basic step angle thereof is equal to, for example, 1.8°. The angular position $\theta$ of the throttle valve 110 is expressed in unit of a micro step angle equal to the basic step angle divided by a given number N (for example, 18). The micro step angle is equal to, for example, 0.1°. The command values IA and IB of the A-phase drive current and the B-phase drive current with respect to every angular position $\theta$ of the throttle valve 110 are set according to equations as $IA=I\cdot\cos\theta$ and $IB=I\cdot\sin\theta$.

Figure 15:
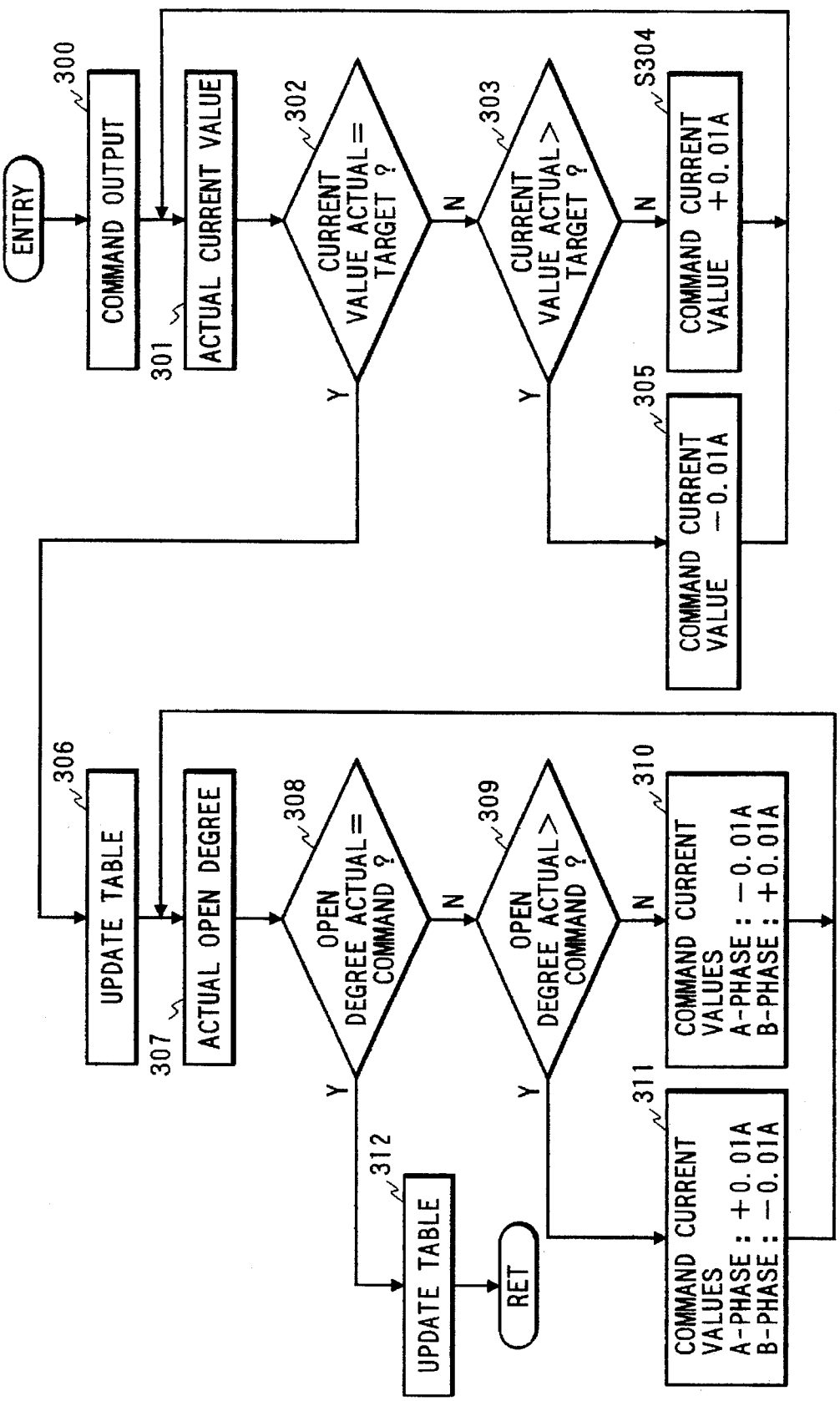
FIG. 15 is a flowchart of a segment of a program for controlling a CPU in the system of FIG. 14.

The CPU 101C operates in accordance with a program stored in an internal ROM. FIG. 15 is a flowchart of a segment of the program which relates to table correction using a plurality of learning processes. The program segment in FIG. 15 is executed once when an engine ignition switch (not shown) is changed to an on position. The program segment in FIG. 15 may be executed while the throttle valve 110 remains closed, for example, while the engine is idling.

With reference to FIG. 15, a first step 300 of the program segment generates a signal which represents a requirement for movement of the throttle valve 110 to a preset angular position, for example, a position corresponding to an angle of 0.2° in a direction from an A-phase point toward a B-phase point. The step 300 reads out digital signals (data pieces) of command values or target values of A-phase and B-phase drive currents from the table in the RAM 114A in response to the required angular position of the throttle valve 110. In the case where the required angular position of the throttle valve 110 agrees with 0.2°, the command values or the target values of the A-phase drive current and the B-phase drive current which are represented by the digital signals read out from the RAM 114A are equal to 3.43 A and 0.68 A respectively (see FIG. 12). The step 300 outputs the digital signals of the command values (the target values) of the A-phase drive current and the B-phase drive current to the D/A converters 102. As a result, drive currents corresponding to the command values (the target values) are actually fed to the A-phase stator winding and the B-phase stator winding in the stepping motor 106A respectively. After the step 300, the program advances to a step 301.

The step 301 derives the actual values of the drive currents through the A-phase stator winding and the B-phase stator winding in the stepping motor 106A by referring to the output signals of the LPF's 109.

A step 302 following the step 301 determines whether or not the actual value is equal to the target value with respect to each of the drive currents through the A-phase stator winding and the B-phase stator winding. When at least one actual current value is not equal to the corresponding target current value, the program advances from the step 302 to a step 303. When the actual current values are equal to the target current values, the program advances from the step 302 to a step 306.

The step 303 compares the actual value and the target value with respect to each of the A-phase drive current and the B-phase drive current. When the actual current value is not greater than the target current value, the program advances from the step 303 to a step 304. When the actual current value is greater than the target current value, the program advances from the step 303 to a step 305.

The step 304 corrects the command value of at least one of the A-phase drive current and the B-phase drive current. Specifically, the step 304 increments the command current value by a value of 0.01 A. The step 304 outputs a signal representative of the correction-resultant command value to the D/A converter 102. As a result, at least one of the A-phase drive current and the B-phase drive current is incremented. After the step 304, the program returns to the step 301.

The step 305 corrects the command value of at least one of the A-phase drive current and the B-phase drive current. Specifically, the step 305 decrements the command current value by a value of 0.01 A. The step 305 outputs a signal representative of the correction-resultant command value to the D/A converter 102. As a result, at least one of the A-phase drive current and the B-phase drive current is decremented. After the step 305, the program returns to the step 301.

A loop of the steps 301, 302, 303, 304, and 305 is reiterated until the actual values of the A-phase drive current and the B-phase drive current become equal to the target values of the A-phase drive current and the B-phase drive current respectively. A first learning process is implemented by the steps 301, 302, 303, 304, 305 and 306.

As previously described, when the actual current values of the A-phase drive current and the B-phase drive current are equal to the target current values of the A-phase drive current and the B-phase drive current respectively, the program advances from the step 302 to the step 306. The step 306 updates the command current values in the table in the RAM 114A according to the latest command values of the A-phase drive current and the B-phase drive current. Specifically, the step 306 replaces the command current values in the table with the latest command values of the A-phase drive current and the B-phase drive current. After the step 206, the program advances to a step 307.

The step 307 derives the actual angular position of the throttle valve 110 by referring to the output signal of a throttle sensor 107.

A step 308 following the step 307 determines whether or not the actual angular position of the throttle valve 110 is equal to a command angular position of the throttle valve 110 which agrees with the required angular position thereof. When the actual angular position of the throttle valve 110 is not equal to the command angular position of the throttle valve 110, the program advances from the step 308 to a step 309. When the actual angular position of the throttle valve 110 is equal to the command angular position of the throttle valve 110, the program advances from the step 308 to a step 312.

The step 309 compares the actual angular position of the throttle valve 110 with the command angular position of the throttle valve 110. When the actual angular position of the throttle valve 110 is not greater than the command angular position of the throttle valve 110, the program advances from the step 309 to a step 310. When the actual angular position of the throttle valve 110 is greater than the command angular position of the throttle valve 110, the program advances from the step 309 to a step 311.

The step 310 corrects the command values of the A-phase drive current and the B-phase drive current. Specifically, the step 310 decrements the command value of the A-phase drive current by a value of 0.01 A, and increments the command value of the B-phase drive current by a value of 0.01 A. The step 310 outputs signals representative of the correction-resultant command current values to the D/A converters 102. As a result, the drive currents fed to the A-phase stator winding and the B-phase stator winding in the stepping motor 106A are decremented and incremented respectively so that the throttle valve 110 will rotate toward a larger angle side. After the step 310, the program returns to the step 307.

The step 311 corrects the command values of the A-phase drive current and the B-phase drive current. Specifically, the step 311 increments the command value of the A-phase drive current by a value of 0.01 A, and decrements the command value of the B-phase drive current by a value of 0.01 A. The step 311 outputs signals representative of the correction-resultant command current values to the D/A converters 102. As a result, the drive currents fed to the A-phase stator winding and the B-phase stator winding in the stepping motor 106A are incremented and decremented respectively so that the throttle valve 110 will rotate toward a smaller angle side. After the step 311, the program returns to the step 307.

A loop of the steps 307, 308, 309, 310, and 311 is reiterated until the actual angular position of the throttle valve 110 becomes equal to the command angular position of the throttle valve 110. A second learning process is implemented by the steps 307, 308, 309, 310, 311, and 312.

As previously described, when the actual angular position of the throttle valve 110 is equal to the command angular position of the throttle valve 110, the program advances from the step 308 to the step 312. The step 312 updates the command current values in the table in the RAM 114A according to the latest command values of the A-phase drive current and the B-phase drive current. Specifically, the step 312 replaces the command current values in the table with the latest command values of the A-phase drive current and the B-phase drive current. After the step 312, the program exits from the program segment and then returns to a main routine (not shown).

Figure 16:
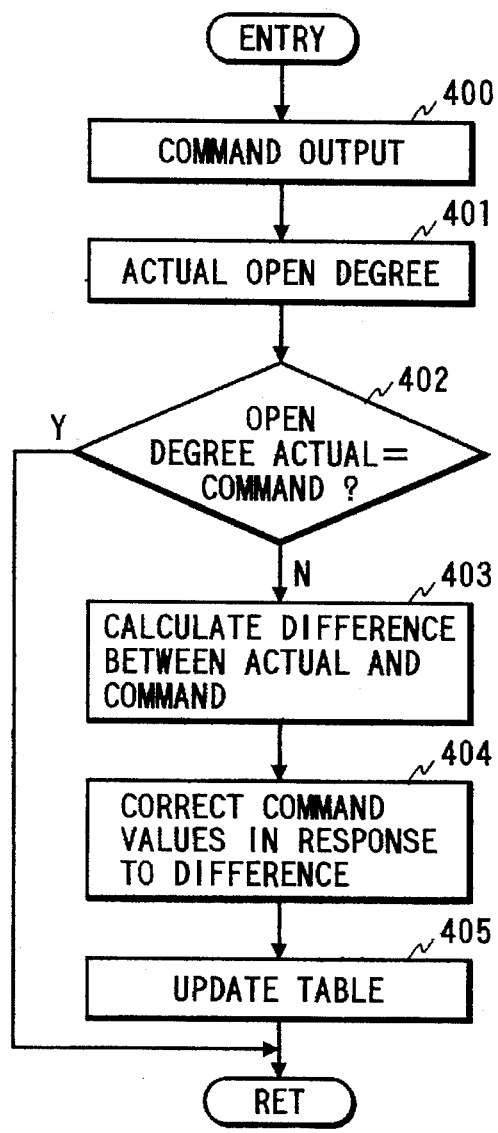
FIG. 16 is a flowchart of a segment of a program for controlling a CPU in a modified electronic throttle system for an internal combustion engine according to this invention.

FIG. 16 relates to a modification of the system of FIGS. 8–10. The modified system of FIG. 16 is similar to the system of FIGS. 8–10 except for design changes indicated hereinafter. FIG. 16 is a flowchart of a segment of a program for controlling a CPU 101A (see FIG. 8).

With reference to FIG. 16, a first step 400 of the program segment generates a signal which represents a requirement for movement of a throttle valve 110 (see FIG. 8) to a preset angular position, for example, a position corresponding to an angle of 0.2° in a direction from an A-phase point toward a B-phase point. The step 400 reads out digital signals (data pieces) of command values of A-phase and B-phase drive currents from a table in a RAM 114 (see FIG. 8) in response to the required angular position of the throttle valve. In the case where the required angular position of the throttle valve 110 agrees with 0.2°, the command values of the A-phase drive current and the B-phase drive current which are represented by the digital signals read out from the RAM 114 are equal to 3.43 A and 0.68 A respectively (see FIG. 9). The step 400 outputs the digital signals of the command values of the A-phase drive current and the B-phase drive current to D/A converters 102 (see FIG. 8). As a result, drive currents corresponding to the command values are actually fed to an A-phase stator winding and a B-phase stator winding in a stepping motor 106A (see FIG. 8) respectively.

A step 401 following the step 400 derives the actual angular position of the throttle valve 110 by referring to the output signal of a throttle sensor 107 (see FIG. 8).

A step 402 following the step 401 determines whether or not the actual angular position of the throttle valve 110 is equal to a command angular position of the throttle valve 110 which agrees with the required angular position thereof. When the actual angular position of the throttle valve 110 is not equal to the command angular position of the throttle valve 110, the program advances from the step 402 to a step 403. When the actual angular position of the throttle valve 110 is equal to the command angular position of the throttle valve 110, the program exits from the program segment and then returns to a main routine (not shown).

The step 403 calculates or estimates values of the A-phase drive current and the B-phase drive current at which the throttle valve 110 assumes the command angular position. This calculation or estimation is executed in response to, for example, the difference between the actual angular position of the throttle valve 110 and the command angular position of the throttle valve 110. The step 403 calculates the differences between the command current values and the calculated or estimated current values.

A step 404 following the step 403 corrects the command values of the A-phase drive current and the B-phase drive current in response to the current differences calculated by the step 403. The step 404 outputs digital signals of the correction-resultant command values of the A-phase drive current and the B-phase drive current to the D/A converters 102. Consequently, the drive currents fed to the A-phase stator winding and the B-phase stator winding in the stepping motor 106A are corrected accordingly.

A step 405 following the step 404 updates the command current values in the table in the RAM 114 according to the latest command values of the A-phase drive current and the B-phase drive current. Specifically, the step 405 replaces the command current values in the table with the latest command values of the A-phase drive current and the B-phase drive current. After the step 405, the program exits from the program segment and then returns to the main routine.

Figure 17:
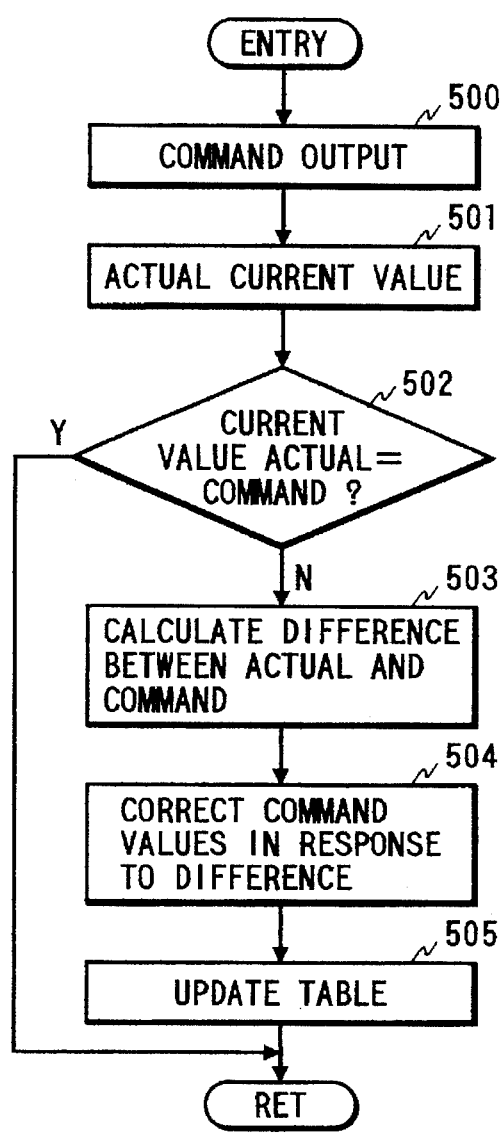
FIG. 17 is a flowchart of a segment of a program for controlling a CPU in a modified electronic throttle system for an internal combustion engine according to this invention.

FIG. 17 relates to a modification of the system of FIGS. 11–13. The modified system of FIG. 17 is similar to the system of FIGS. 11–13 except for design changes indicated hereinafter. FIG. 17 is a flowchart of a segment of a program for controlling a CPU 101B (see FIG. 11).

With reference to FIG. 17, a first step 500 of the program segment generates a signal which represents a requirement for movement of a throttle valve 110 (see FIG. 11) to a preset angular position, for example, a position corresponding to an angle of 0.2° in a direction from an A-phase point toward a B-phase point. The step 500 reads out digital signals (data pieces) of command values or target values of A-phase and B-phase drive currents from a table in a RAM 114A (see FIG. 11) in response to the required angular position of the throttle valve 110. In the case where the required angular position of the throttle valve 110 agrees with 0.2°, the command values or the target values of the A-phase drive current and the B-phase drive current which are represented by the digital signals read out from the RAM 114A are equal to 3.43 A and 0.68 A respectively (see FIG. 12). The step 500 outputs the digital signals of the command values (the target values) of the A-phase drive current and the B-phase drive current to D/A converters 102 (see FIG. 11). As a result, drive currents corresponding to the command values (the target values) are actually fed to an A-phase stator winding and a B-phase stator winding in a stepping motor 106A (see FIG. 11) respectively.

A step 501 following the step 500 derives the actual values of the drive currents through the A-phase stator winding and the B-phase stator winding in the stepping motor 106A by referring to the output signals of LPF's 109 (see FIG. 11).

A step 502 following the step 501 determines whether or not the actual value is equal to the target value with respect to each of the drive currents through the A-phase stator winding and the B-phase stator winding. When at least one actual current value is not equal to the corresponding target current value, the program advances from the step 502 to a step 503. When the actual current values are equal to the target current values, the program exits from the program segment and then returns to a main routine (not shown).

The step 503 calculates the differences between the command current values and the actual current values.

A step 504 following the step 503 corrects the command values of the A-phase drive current and the B-phase drive current in response to the current differences calculated by the step 503. The step 504 outputs digital signals of the correction-resultant command values of the A-phase drive current and the B-phase drive current to the D/A converters 102. Consequently, the drive currents fed to the A-phase stator winding and the B-phase stator winding in the stepping motor 106A are corrected accordingly.

A step 505 following the step 504 updates the command current values in the table in the RAM 114 according to the latest command values of the A-phase drive current and the B-phase drive current. Specifically, the step 505 replaces the command current values in the table with the latest command values of the A-phase drive current and the B-phase drive current. After the step 505, the program exits from the program segment and then returns to the main routine.

The system of FIG. 16 and the system of FIG. 17 may be combined so that the command current values or the target current values can be corrected in response to the error (the difference) between the actual angular position of the throttle valve 110 and the command angular position of the throttle valve 110 as well as the errors (the differences) between the actual current values and the target current values. The system of FIG. 16 and the system of FIGS.

11–13 may be combined. The system of FIG. 17 and the system of FIGS. 8–10 may be combined.

The systems of FIGS. 8–17 may be modified as follows. A ROM is provided which stores data representing initial command values of drive currents. A flag is used as an indication of whether or not table correction using a learning process can be executed. According to a suitable way, a determination is made as to whether or not a RAM storing a command current value table is wrong. In the case where the flag represents that the table correction can not be executed or in the case where the RAM is found to be wrong, a CPU uses the ROM instead of the RAM in air flow rate control (throttle valve control).

Figure 18:
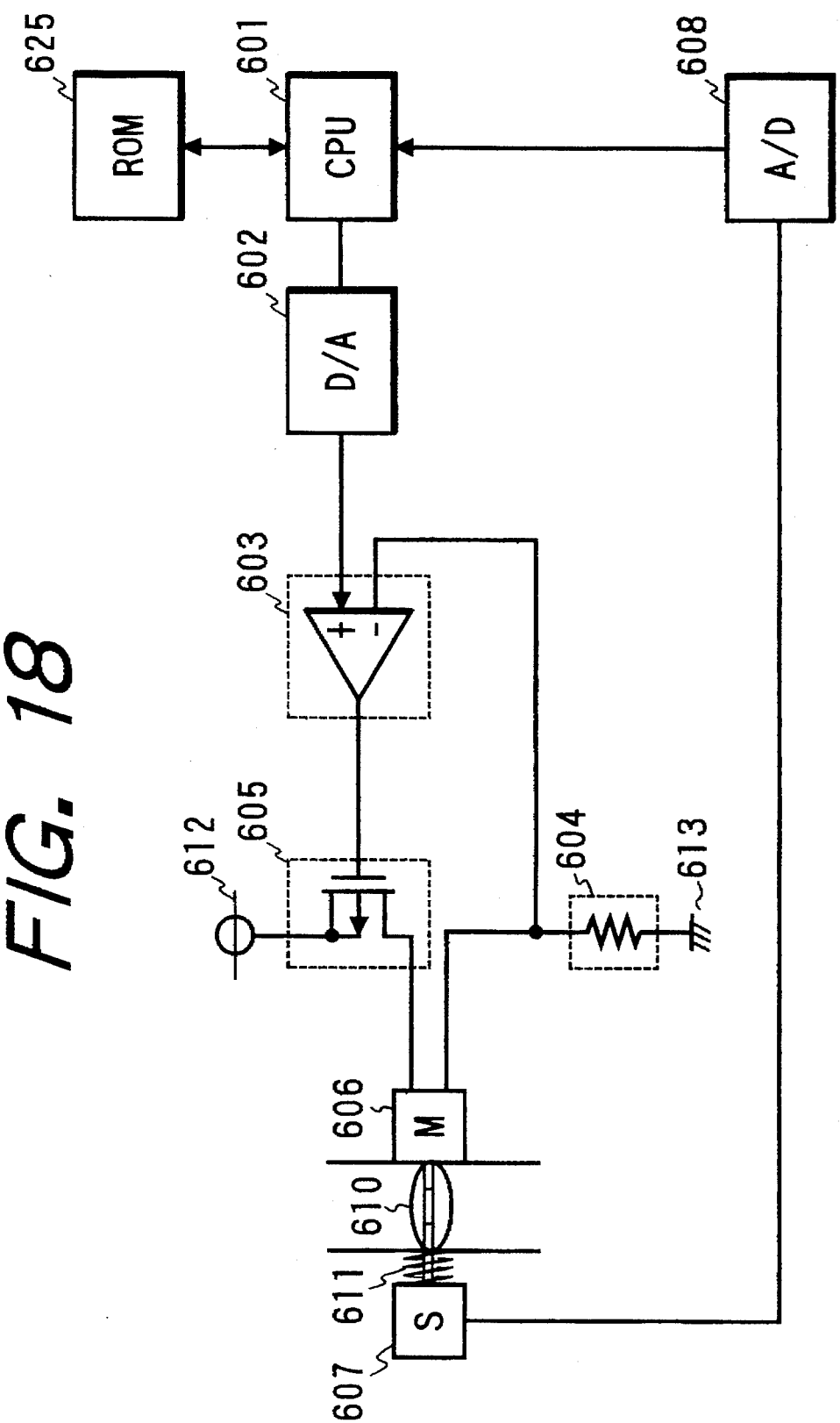
FIG. 18 is a diagram of a modified electronic throttle system for an internal combustion engine according to this invention.

FIG. 18 shows a modification of the system of FIG. 4. The modified system of FIG. 18 is similar to the system of FIG. 4 except for design changes indicated hereinafter. The modified system of FIG. 18 includes a CPU 601 instead of the CPU 101 of FIG. 4. While an internal combustion engine is idling, the CPU 601 serves to control the degree of opening of a throttle valve 610 (that is, the position of the throttle valve 610) to maintain an engine speed at a desired engine speed or a target engine speed.

When a command to drive the throttle valve 610 is generated, the CPU 601 reads out digital signals (data pieces) of command values of A-phase and B-phase drive currents from a ROM (read only memory) 625 and outputs the readout digital signals to D/A converters 602. The digital signals of the command values of the A-phase drive current and the B-phase drive current are changed by the D/A converters 602 into corresponding analog signals which are applied to comparators 603.

Drive currents corresponding to the command values are actually fed to an A-phase stator winding and a B-phase stator winding in a stepping motor 606 in a way similar to the way executed in the system of FIG. 4. Thus, the stepping motor 606 is driven so that the output shaft thereof can assume a desired angular position. The output shaft of the stepping motor 606 is coupled with the shaft of the throttle valve 610 in a manner such that the output shaft of the stepping motor 606 and the shaft of the throttle valve 610 can rotate together at equal angular velocities. Thus, the angular position of the throttle valve 610 can be regarded as being equal to the angular position of the output shaft of the stepping motor 606.

Figure 19:
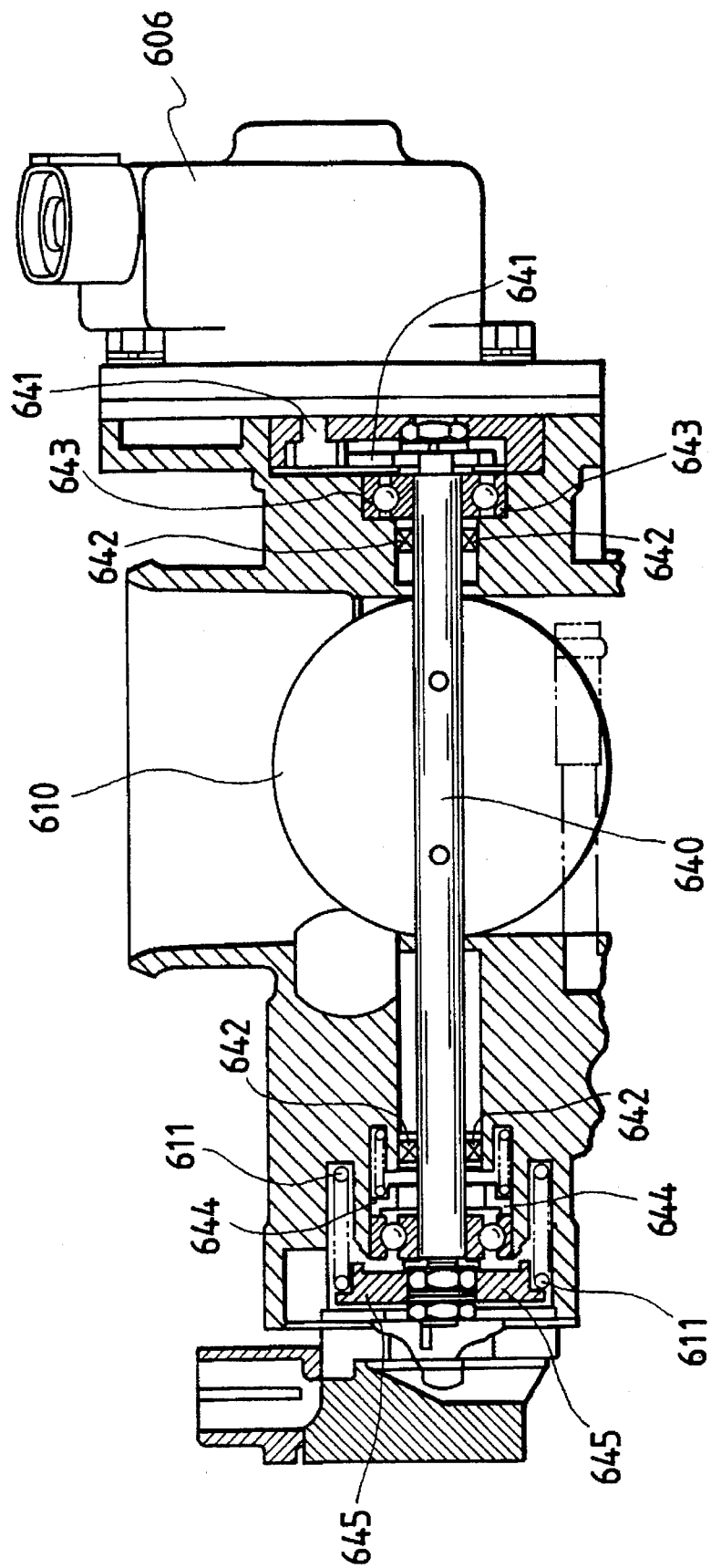
FIG. 19 is a sectional view of a throttle valve, a stepping motor, and related parts in the system of FIG. 18.

As shown in FIG. 19, the output shaft of the stepping motor 606 is connected to the shaft 640 of the throttle valve 610 via gears 641. As the output shaft of the stepping motor 606 rotates, the throttle valve 610 rotates and thus the degree of opening of the throttle valve 610 varies. A return spring 611 urges the throttle valve 610 in the direction of closing the throttle valve 610. The return spring 611 is provided on outer surfaces of a housing 643 which accommodates one end of the shaft 640. The return spring 611 and the shaft 640 are pressed and held by a bush 645. Two opposite ends of the shaft 640 are supported by bearings 642. Oil placed inside the bearings 642 provide oil seals extending around the shaft 640. The bearings 642 and the oil enable smooth rotation of the shaft 640.

In general, a friction results from contact between a rotating member (a moving member) and a support for the rotating member (the moving member). Accordingly, there occur frictions between the return spring 611 and the bush 645, between the return spring 611 and the housing 643, between the oil seal and the shaft 640, and between the gears 641. Furthermore, frictions occur in the bearings 642. These frictions are maximized immediately before the output shaft of the stepping motor 606 and the throttle valve 610 start to move. The maximum frictions are referred to as maximum statical frictions.

The ROM 625 stores data representing a table of the relation among the angular position of the throttle valve 610 (that is, the degree of opening of the throttle valve 610) and initial command values of A-phase and B-phase drive currents. The table is similar to that shown in FIG. 9. The stepping motor 606 is designed so that a basic step angle thereof is equal to, for example, 1.8°. The angular position $\theta$ of the throttle valve 110 is expressed in unit of a micro step angle equal to the basic step angle divided by a given number N (for example, 18). The micro step angle is equal to, for example, 0.1°. The command values IA and IB of the A-phase drive current and the B-phase drive current with respect to every angular position $\theta$ of the throttle valve 110 are set according to equations as $IA = I \cdot \cos\theta$ and $IB = I \cdot \sin\theta$.

As will be made clear later, during a given short interval in connection with start of rotation of the output shaft of the stepping motor 606, command values of an A-phase drive current and a B-phase drive currents are increased from those read out from the table in the ROM 625 while the ratio between the increased command values remains equal to the ratio between the command values in the table. The increases in the command current values are designed so that a drive force applied to the throttle valve 610 by the stepping motor 606 can overcome the previously-indicated maximum statical frictions. The output shaft of the stepping motor 606 starts to rotate in response to the increased command current values. The given short interval is chosen to cover a period in which vibration of the rotor in the stepping motor 606 is over. After the given short interval elapses, the increases in the command current values are canceled and therefor the command current values read out from the table are directly used to control the stepping motor 606.

Figure 20:
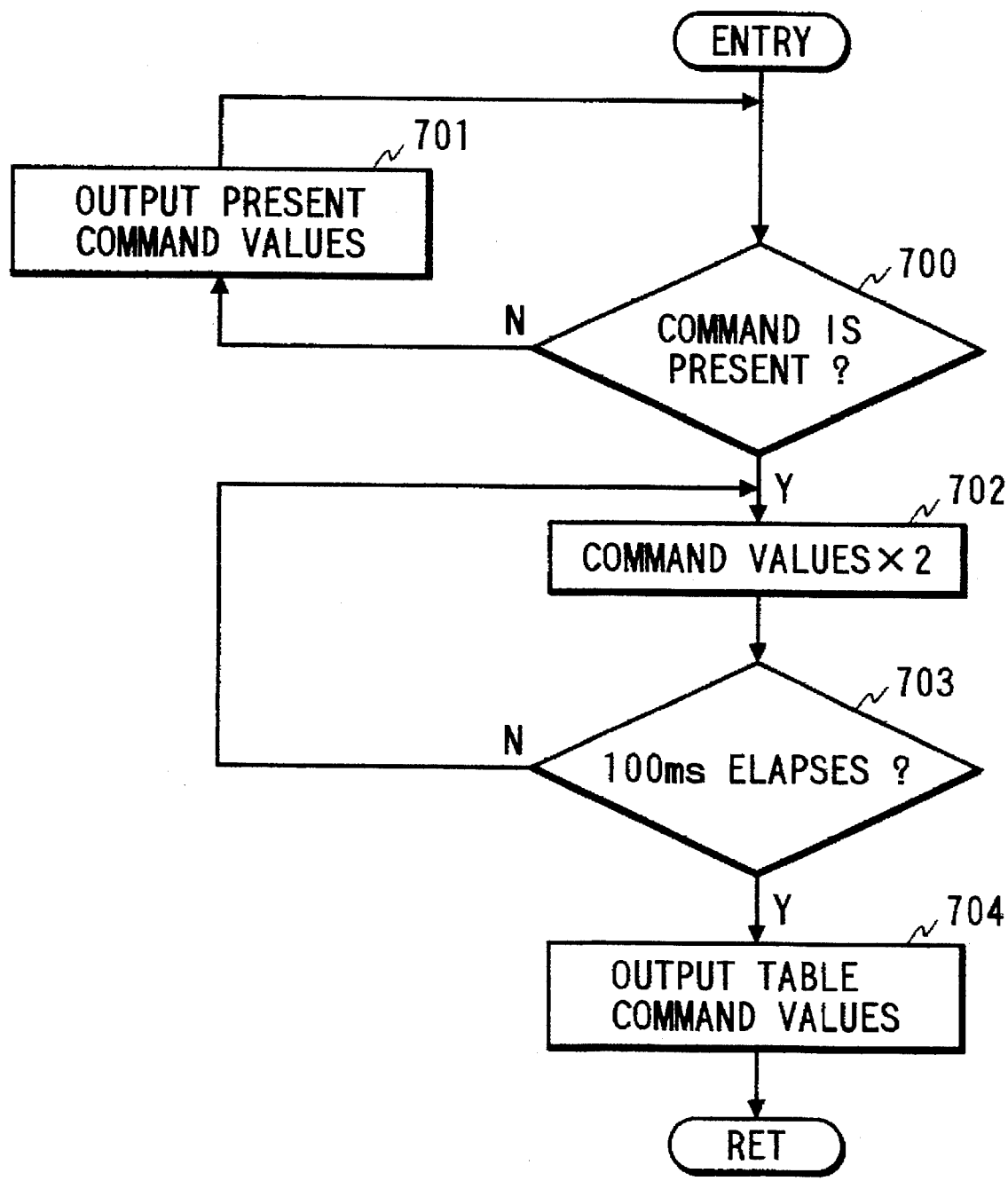
FIG. 20 is a flowchart of a segment of a program for controlling a CPU in the system of FIG. 18.

The CPU 601 operates in accordance with a program stored in an internal ROM. FIG. 20 is a flowchart of a segment of the program which relates to control of the stepping motor 606, that is, control of the throttle valve 610.

With reference to FIG. 20, a first step 700 of the program segment determines whether a requirement for movement of the throttle valve 610 is present or absent. When the requirement is absent, the program advances from the step 700 to a step 701. When the requirement is present, the program advances from the step 700 to a step 702.

The step 701 outputs digital signals of present command values of an A-phase drive current and a B-phase drive current to the D/A converters 602 to hold the throttle valve 610 at a present angular position. It should be noted that the digital signals of the present command values of the A-phase drive current and the B-phase drive current are previously read out from the table in the ROM 625. In the case where the present angular position of the throttle valve 610 corresponds to an angle of 0°, the present command values of the A-phase drive current and the B-phase drive current are equal to 3.47 A and 0.00 A respectively (see FIG. 9). As a result of the execution of the step 701, the throttle valve 610 remains at the present angular position. After the step 701, the program returns to the step 700.

The step 702 reads out digital signals (data pieces) of command values of A-phase and B-phase drive currents from the table in the ROM 625 in response to the angular position to which the throttle valve 610 is required to move. In the case where the throttle valve 610 is required to move to an angular position corresponding to an angle of 0.1°, the command values of the A-phase drive current and the B-phase drive current which are represented by the digital signals read out from the table in the ROM 625 are equal to 3.47 A and 0.34 A respectively (see FIG. 9). The step 702 increases the command current values by multiplying them by a predetermined factor greater than 1, for example, a factor of 2. In the case where the multiplying factor is equal to 2, the command values of the A-phase drive current and the B-phase drive current are increased to 6.94 A and 0.68 A respectively. The step 702 outputs digital signals of the increased command values of the A-phase drive current and the B-phase drive current to the D/A converters 602. As a result, drive currents corresponding to the increased command values are actually fed to the A-phase stator winding and the B-phase stator winding in the stepping motor 606 respectively. After the step 702, the program advances to a step 703.

The step 703 determines whether or not a given time, for example, 100 ms, has elapsed since the moment of the first execution of the step 702. When the given time has not yet elapsed, the program returns from the step 703 to the step 702. When the given time has elapsed, the program advances from the step 703 to a step 704.

Accordingly, during the given time, the digital signals of the increased command values of the A-phase drive current and the B-phase drive current remain outputted to the D/A converters 602, and the drive currents corresponding to the increased command values continue to be fed to the A-phase stator winding and the B-phase stator winding in the stepping motor 606 respectively.

The step 704 reads out the digital signals (the data pieces) of the command values of the A-phase drive current and the B-phase drive current from the table in the ROM 625 in response to the angular position to which the throttle valve 610 is required to move. In the case where the throttle valve 610 is required to move to an angular position corresponding to an angle of 0.1°, the command values of the A-phase drive current and the B-phase drive current which are represented by the digital signals read out from the table in the ROM 625 are equal to 3.47 A and 0.34 A respectively (see FIG. 9). The step 704 outputs the digital signals of the command values of the A-phase drive current and the B-phase drive current to the D/A converters 602. As a result, drive currents corresponding to the command values are actually fed to the A-phase stator winding and the B-phase stator winding in the stepping motor 606 respectively. The step 704 differs from the step 702 in that the step 704 does not increase the command current values. After the step 704, the program exits from the program segment and then returns to a main routine (not shown).

Before the rotor within the stepping motor 606 stops at a target angular position (a desired angular position), the rotor tends to vibrate around the target angular position due to inertia. The vibration of the rotor is attenuated and then disappears as time goes by. The step 703 implements waiting the disappearance of such vibration of the rotor.

Figure 21:
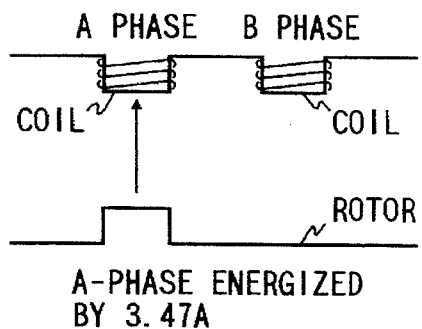
FIG. 21, FIG. 22, FIG. 23, FIG. 24, and FIG. 25 are diagrams of the stepping motor in the system of FIG. 18.
Figure 22:
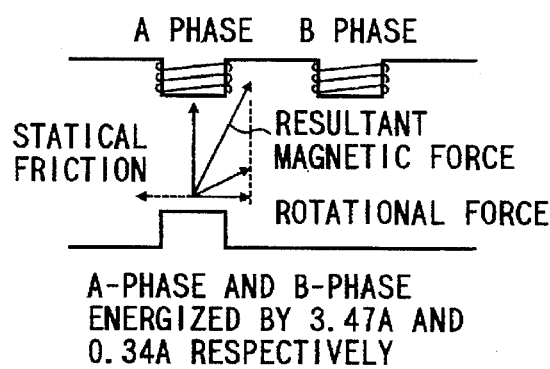
Figure 23:
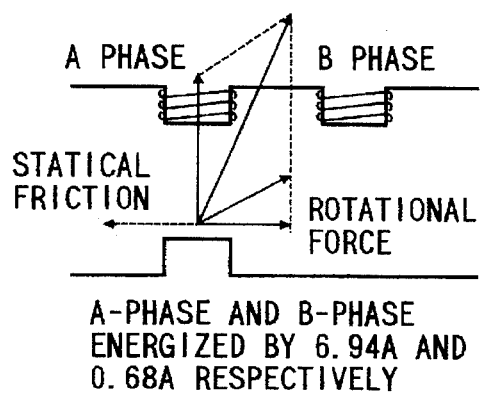
Figure 24:
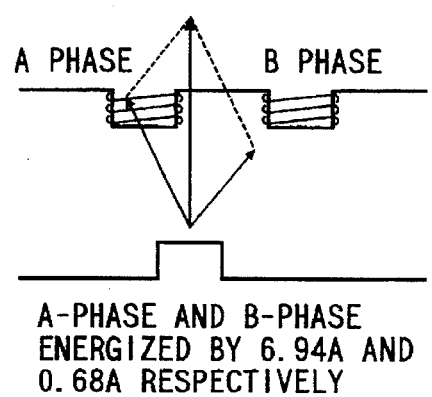
Figure 25:
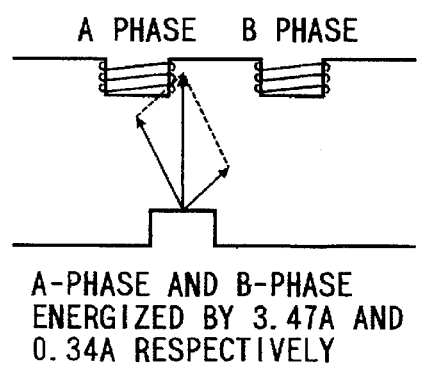

The operation of the system of FIG. 18 will be further described. It is now assumed that the rotor within the stepping motor 606 (that is, the throttle valve 610) is required to move from an angular position of 0° (see FIG. 21) to an angular position of 0.1° (see FIG. 25). With regard to the angular position of 0.1°, the command values of the A-phase drive current and the B-phase drive current in the table are equal to 3.47 A and 0.34 A respectively (see FIG. 9). If a drive current of 3.47 A and a drive current of 0.34 A are fed to the A-phase stator winding and the B-phase stator winding in the stepping motor 606 respectively, the rotor in the stepping motor 606 receives a rotational force weaker than the resultant of the previously-indicated maximum statical frictions as shown in FIG. 22. Therefore, in this supposed case, the rotor in the stepping motor 606 can not move from the angular position of 0°. On the other hand, in the system of FIG. 18, the command values of the A-phase drive current and the B-phase drive current are increased to, for example, 6.94 A and 0.68 A respectively by a doubling process. Accordingly, a drive current of 6.94 A and a drive current of 0.68 A are fed to the A-phase stator winding and the B-phase stator winding in the stepping motor 606 respectively, and the rotor in the stepping motor 606 receives a rotational force stronger than the resultant of the previously-indicated maximum statical frictions as shown in FIG. 23. Therefore, the rotor in the stepping motor 606 moves from the angular position of 0° toward the angular position of 0.1° as shown in FIG. 24. Before the rotor in the stepping motor 606 stops at the angular position of 0.1°, the rotor tends to vibrate around the angular position of 0.1° due to inertia. The vibration of the rotor is attenuated and then disappears as time goes by. In the system of FIG. 18, a process of waiting the disappearance of such vibration of the rotor is executed by the step 703 of FIG. 20. After the given time (for example, 100 ms) has elapsed, the command values of the A-phase drive current and the B-phase drive current are reduced to 3.47 A and 0.34 A respectively. Consequently, the drive currents fed to the A-phase stator winding and the B-phase stator winding in the stepping motor 606 are reduced accordingly. The reduction of the drive currents is advantageous in decreasing the rate of consumption of electric power.

A first modification of the system of FIGS. 18–25 will be described. In general, the force of the return spring 611 (see FIG. 19) is chosen so that the throttle valve 610 will be closed when the stepping motor 606 malfunctions. In view of the presence of the return spring 611, it is preferable that the strength of a drive force generated by the stepping motor 606 to open the throttle valve 610 differs from the strength of a drive force generated by the stepping motor 606 to close the throttle valve 610. In other words, it is preferable to give a hysteresis characteristic to the drive force on the throttle valve 610.

With reference to FIG. 26, since the return spring 611 urges the throttle valve 610 in the direction of closing the throttle valve 610, a load torque on the actuator (the stepping motor 606) for the throttle valve 610 increases as the degree of opening of the throttle valve 610 increases. To open the throttle valve 610, a drive force applied to the throttle valve 610 by the stepping motor 606 is stronger than the resultant of the force of the return spring 611 and the frictional force. To close the throttle valve 610, a drive force applied to the throttle valve 610 by the stepping motor 606 is weaker than the force of the return spring 611 minus the frictional force.

The first modification of the system of FIGS. 18–25 includes two different command current value tables, that is, a command current value table for opening the the throttle valve 610 and a command current value table for closing the throttle valve 610. FIG. 27 shows a portion of the command current value table for opening the throttle valve 610. FIG. 28 shows a portion of the command current value table for closing the throttle valve 610. The stepping motor positions "0", "1", "2", "3", ... in FIGS. 27 and 28 correspond to the throttle valve angles "0°", "0.1°", "0.2°", "0.3°", ... respectively. As shown in FIGS. 27 and 28, at a same stepping motor position, command current values for opening the throttle valve 610 are greater than command current values for closing the throttle valve 610. Each of the tables in FIGS. 27 and 28 indicates the relation among the stepping motor position and command values of A-phase and B-phase drive currents. The command current value tables in FIGS. 27 and 28 are represented by data stored in the ROM 625 (see FIG. 18).

Figure 29:
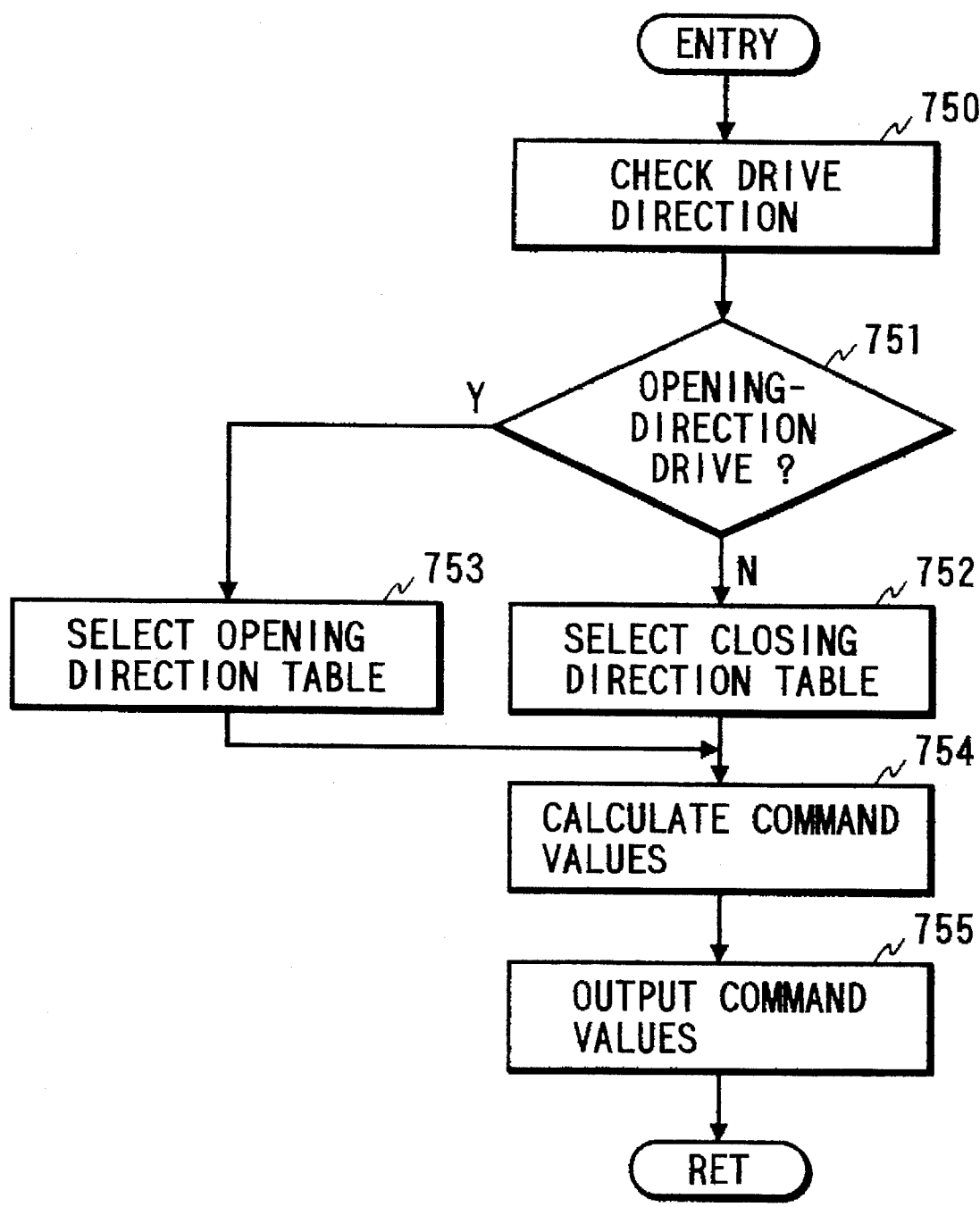
FIG. 29 is a flowchart of a segment of a program for controlling a CPU in the system related to FIGS. 27 and 28.

In the first modification of the system of FIGS. 18–25, the CPU 601 (see FIG. 18) operates in accordance with a program stored in an internal ROM. FIG. 29 is a flowchart of a segment of the program which relates to control of the stepping motor 606, that is, control of the throttle valve 610. The program segment of FIG. 29 is started by the occurrence of a requirement for movement of the throttle valve 610.

With reference to FIG. 29, a first step 750 of the program segment detects the direction of the required movement of the throttle valve 610.

A step 751 following the step 750 determines whether the direction of the required movement of the throttle valve 610 agrees with a direction of opening the throttle valve 610 or a direction of closing the throttle valve 610. When the direction of the required movement agrees with the closing direction, the program advances from the step 751 to a step 752. When the direction of the required movement agrees with the opening direction, the program advances from the step 751 to a step 753.

The step 752 selects the command current value table for closing the throttle valve 610 in the ROM 625. After the step 752, the program advances to a step 754.

The step 753 selects the command current value table for opening the throttle valve 610 in the ROM 625. After the step 753, the program advances to the step 754.

The step 754 accesses the command current value table last selected by the step 752 or 753, and reads out digital signals (data pieces) of command values of A-phase and B-phase drive currents from the table in response to the angular position to which the throttle valve 610 is required to move. In the case where the throttle valve 610 is required to close to an angular position corresponding to an angle of 0.1°, the command values of the A-phase drive current and the B-phase drive current which are represented by the digital signals read out from the table for closing the throttle valve 610 are equal to 3.46 A and 0.33 A respectively (see FIG. 28). In the case where the throttle valve 610 is required to open to an angular position corresponding to an angle of 0.3°, the command values of the A-phase drive current and the B-phase drive current which are represented by the digital signals read out from the table for opening the throttle valve 610 are equal to 3.36 A and 1.02 A respectively (see FIG. 27).

A step 755 following the the step 754 outputs digital signals of the command values of the A-phase drive current and the B-phase drive current to the D/A converters 602 (see FIG. 18). As a result, drive currents corresponding to the command values are actually fed to the A-phase stator winding and the B-phase stator winding in the stepping motor 606 respectively. After the step 755, the program exits from the program segment and then returns to a main routine (not shown).

A second modification of the system of FIGS. 18–25 will be described. The second modification of the system of FIGS. 18–25 provides the drive force on the throttle valve 610 with a hysteresis characteristic.

The second modification of the system of FIGS. 18–25 includes a command current value table which indicates the relation among the stepping motor position and original command values of A-phase and B-phase drive currents. FIG. 30 shows a portion of the command current value table.

The stepping motor positions "0", "1", "2", "3", ... in FIG. 30 correspond to the throttle valve angles "0°", "0.1°", "0.2°", "0.3°", ... respectively. In general, the original command values IA and IB of the A-phase drive current and the B-phase drive current with respect to every stepping motor position $\theta$ are set according to equations as IA=I·cos$\theta$ and IB=I·sin$\theta$. The command current value table in FIG. 30 is represented by data stored in the ROM 625 (see FIG. 18).

Figure 31:
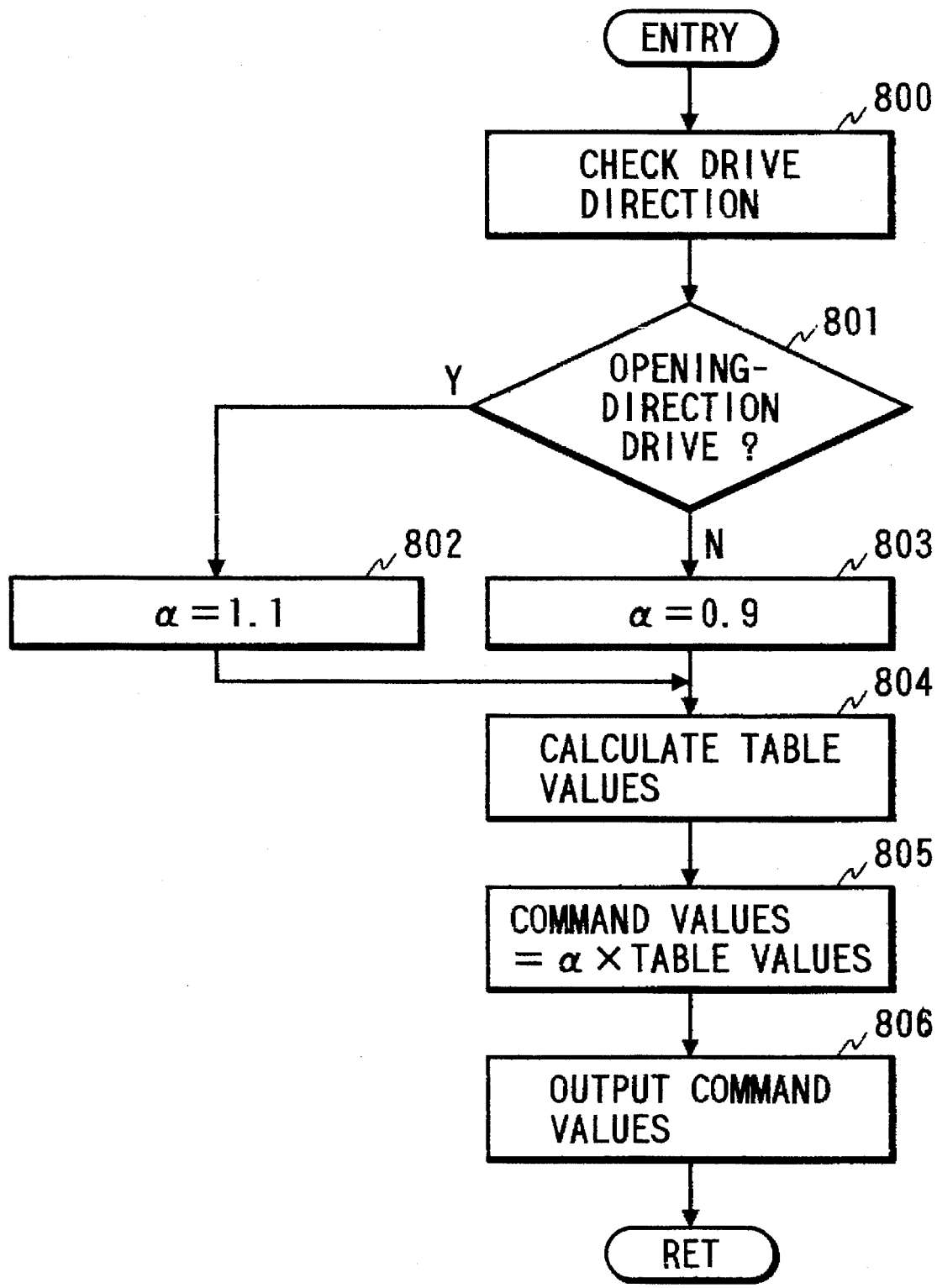
FIG. 31 is a flowchart of a segment of a program for controlling a CPU in the system related to FIG. 30.

In the second modification of the system of FIGS. 18–25, the CPU 601 (see FIG. 18) operates in accordance with a program stored in an internal ROM. FIG. 31 is a flowchart of a segment of the program which relates to control of the stepping motor 606, that is, control of the throttle valve 610. The program segment of FIG. 31 is started by the occurrence of a requirement for movement of the throttle valve 610.

With reference to FIG. 31, a first step 800 of the program segment detects the direction of the required movement of the throttle valve 610.

A step 801 following the step 800 determines whether the direction of the required movement of the throttle valve 610 agrees with a direction of opening the throttle valve 610 or a direction of closing the throttle valve 610. When the direction of the required movement agrees with the opening direction, the program advances from the step 801 to a step 802. When the direction of the required movement agrees with the closing direction, the program advances from the step 801 to a step 803.

The step 802 sets a coefficient "$\alpha$" to a first preset value equal to, for example, 1.1. After the step 802, the program advances to a step 804.

The step 803 sets the coefficient "$\alpha$" to a second preset value equal to, for example, 0.9. The second preset value is smaller than the first preset value. After the step 803, the program advances to the step 804.

The step 804 reads out digital signals (data pieces) of original command values of A-phase and B-phase drive currents from the table in the ROM 625 in response to the angular position to which the throttle valve 610 is required to move. In the case where the throttle valve 610 is required to move to an angular position corresponding to an angle of 0.1°, the original command values of the A-phase drive current and the B-phase drive current which are represented by the digital signals read out from the table are equal to 3.48 A and 0.35 A respectively (see FIG. 30). In the case where the throttle valve 610 is required to move to an angular position corresponding to an angle of 0.3°, the original command values of the A-phase drive current and the B-phase drive current which are represented by the digital signals read out from the table are equal to 3.36 A and 1.02 A respectively (see FIG. 30).

A step 805 following the step 804 calculates a final command value of the A-phase drive current which is equal to the product of the coefficient "$\alpha$" and the original command value of the A-phase drive current. In addition, the step 805 calculates a final command value of the B-phase drive current which is equal to the product of the coefficient "$\alpha$" and the original command value of the B-phase drive current. In the case where the throttle valve 610 is required to close to an angular position corresponding to an angle of 0.1°, since the coefficient "$\alpha$" is equal to 0.9, the final command values of the A-phase drive current and the B-phase drive current are approximately equal to 3.13 A and 0.32 A respectively. In the case where the throttle valve 610 is required to open to an angular position corresponding to an angle of 0.3°, since the coefficient "$\alpha$" is equal to 1.1, the final command values of the A-phase drive current and the B-phase drive current are approximately equal to 3.70 A and 1.12 A respectively.

A step 806 following the the step 805 outputs digital signals of the final command values of the A-phase drive current and the B-phase drive current to the D/A converters 602 (see FIG. 18). As a result, drive currents corresponding to the final command values are actually fed to the A-phase stator winding and the B-phase stator winding in the stepping motor 606 respectively. After the step 806, the program exits from the program segment and then returns to a main routine (not shown).

Figure 32:
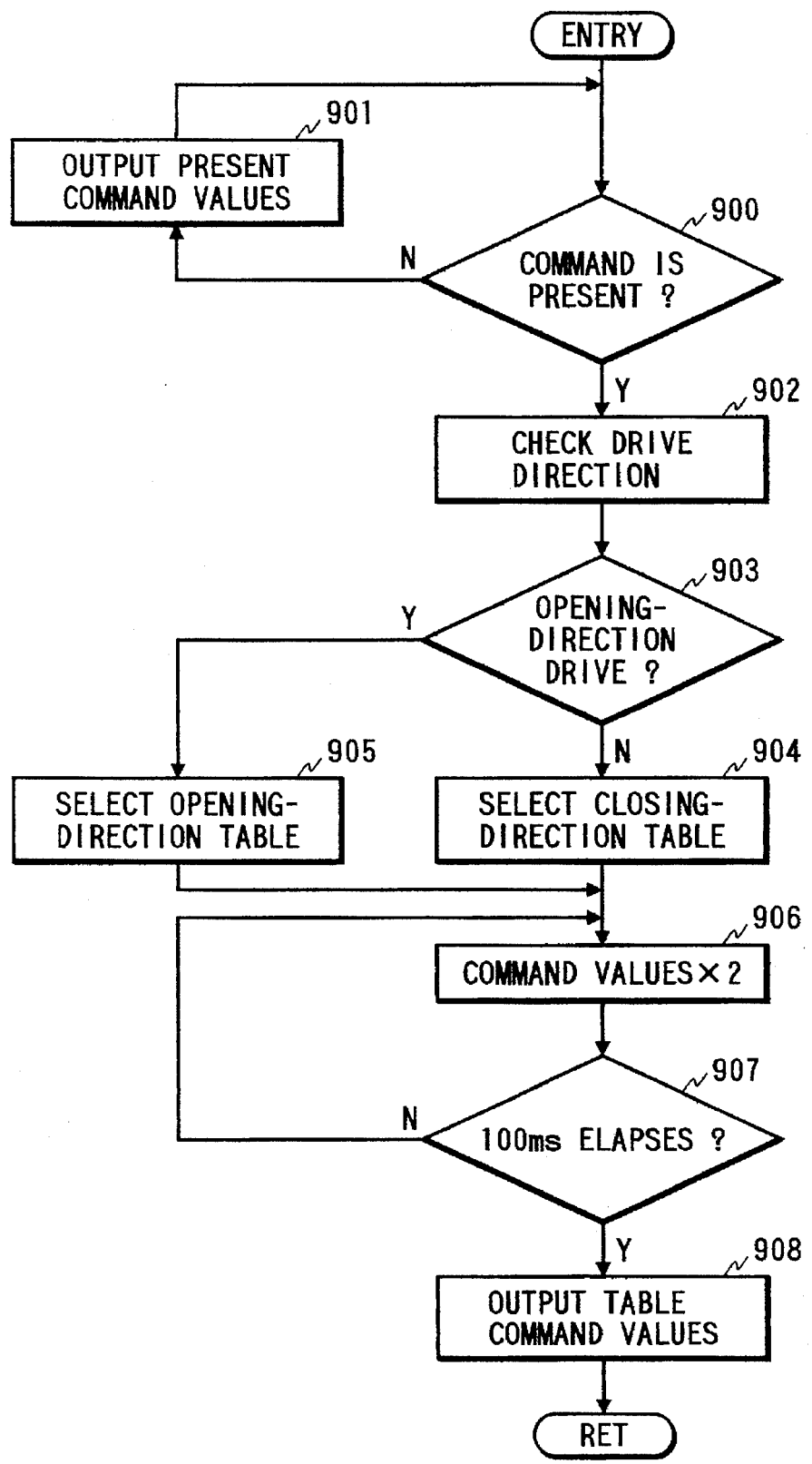
FIG. 32 is a flowchart of a segment of a program for controlling a CPU in a modified electronic throttle system for an internal combustion engine according to this invention.

A third modification of the system of FIGS. 18–25 is a combination of the system of FIGS. 18–25 and the system of FIGS. 26–29. In the third modification of the system of FIGS. 18–25, the CPU 601 (see FIG. 18) operates in accordance with a program stored in an internal ROM. FIG. 32 is a flowchart of a segment of the program which relates to control of the stepping motor 606, that is, control of the throttle valve 610. The program segment in FIG. 32 is iteratively executed at a period of, for example, 4 ms.

With reference to FIG. 32, a first step 900 of the program segment determines whether a requirement for movement of the throttle valve 610 is present or absent. When the requirement is absent, the program advances from the step 900 to a step 901. When the requirement is present, the program advances from the step 900 to a step 902.

The step 901 outputs digital signals of present command values of an A-phase drive current and a B-phase drive current to the D/A converters 602 (see FIG. 18) to hold the throttle valve 610 at a present angular position. As a result of the execution of the step 901, the throttle valve 610 remains at the present angular position. After the step 901, the program returns to the step 900.

The step 902 detects the direction of the required movement of the throttle valve 610.

A step 903 following the step 902 determines whether the direction of the required movement of the throttle valve 610 agrees with a direction of opening the throttle valve 610 or a direction of closing the throttle valve 610. When the direction of the required movement agrees with the closing direction, the program advances from the step 903 to a step 904. When the direction of the required movement agrees with the opening direction, the program advances from the step 903 to a step 905.

The step 904 selects the command current value table for closing the throttle valve 610 in the ROM 625. After the step 904, the program advances to a step 906.

The step 905 selects the command current value table for opening the throttle valve 610 in the ROM 625. After the step 905, the program advances to the step 906.

The step 906 accesses the command current value table last selected by the step 904 or 905, and reads out digital signals (data pieces) of command values of A-phase and B-phase drive currents from the table in response to the angular position to which the throttle valve 610 is required to move. The step 906 increases the command current values by multiplying them by a predetermined factor greater than 1, for example, a factor of 2. The step 906 outputs digital signals of the increased command values of the A-phase drive current and the B-phase drive current to the D/A converters 602. As a result, drive currents corresponding to the increased command values are actually fed to the A-phase stator winding and the B-phase stator winding in the stepping motor 606 respectively. After the step 906, the program advances to a step 907.

The step 907 determines whether or not a given time, for example, 100 ms, has elapsed since the moment of the first execution of the step 906. When the given time has not yet elapsed, the program returns from the step 907 to the step 906. When the given time has elapsed, the program advances from the step 907 to a step 908.

Accordingly, during the given time, the digital signals of the increased command values of the A-phase drive current and the B-phase drive current remain outputted to the D/A converters 602, and the drive currents corresponding to the increased command values continue to be fed to the A-phase stator winding and the B-phase stator winding in the stepping motor 606 respectively.

The step 908 reads out the digital signals (the data pieces) of the command values of the A-phase drive current and the B-phase drive current from the table last selected by the step 904 or 905 in response to the angular position to which the throttle valve 610 is required to move. The step 908 outputs the digital signals of the command values of the A-phase drive current and the B-phase drive current to the D/A converters 602. As a result, drive currents corresponding to the command values are actually fed to the A-phase stator winding and the B-phase stator winding in the stepping motor 606 respectively. The step 908 differs from the step 906 in that the step 908 does not increase the command current values. After the step 908, the program exits from the program segment and then returns to a main routine (not shown).

Before the rotor within the stepping motor 606 stops at a target angular position (a desired angular position), the rotor tends to vibrate around the target angular position due to inertia. The vibration of the rotor is attenuated and then disappears as time goes by. The step 907 implements waiting the disappearance of such vibration of the rotor.

It should be noted that the system of FIGS. 18–25 and the system of FIGS. 30–31 may be combined.

What is claimed is:

1. A stepping motor control apparatus comprising:
    a stepping motor comprising:
        a plurality of coils, and
        a rotor,
        said rotor being rotated by currents fed to said plurality of coils, respective currents of differing magnitudes being simultaneously fed to two of said plurality of coils located at opposite sides of an arbitrary desired held position of said rotor, to thereby hold said rotor at said arbitrary desired held position between said two of said plurality of coils in accordance with respective values of said respective currents; and
    output means for outputting said respective currents to said two of said plurality of coils in correspondence with said desired arbitrary held position of said rotor to energize said two of said plurality of coils and to hold said rotor;
    wherein when said held position of said rotor is changed from a stationary state, said output means outputs increased respective currents to said two of said plurality of coils without changing a ratio between said respective currents.

2. The stepping motor control apparatus of claim 1, further comprising:
    memory means for storing a plurality of current values corresponding to a plurality of desired held positions of said rotor;
    wherein when said held position of said rotor is changed from a stationary state, said output means outputs said respective currents at a level equal to a given value times respective ones of said plurality of current values stored in said memory means.

3. The stepping motor control apparatus of claim 1, further comprising:

a throttle system having only one throttle valve driven by said stepping motor.

4. A stepping motor control apparatus comprising:

a stepping motor comprising:

a plurality of coils including a first coil and a second coil, and a rotor adjacent said plurality of coils, said rotor; and a current generator to output a first current and a second current separate from said first current, respectively to said first coil and said second coil, said first current and said second current having a plurality of sustainable levels, and said rotor being rotated by respective currents fed to said plurality of coils and being holdable in any one of a plurality of positions between said first coil and said second coil based on the respective sustainable level of current being simultaneously output by said current generator to each of said first coil and said second coil;

wherein when said held position of said rotor is moved from a held state, said currents fed to said first coil and said second coil are increased without changing a ratio between said respective currents.

5. The stepping motor control apparatus of claim 4, further comprising:

memory, said memory storing a plurality of current values corresponding to a plurality of desired held positions of said rotor.

6. The stepping motor control apparatus of claim 4, further comprising:

a throttle system having only one throttle valve driven by said stepping motor.

* * * * *